US008678830B2

(12) United States Patent
Gurdin et al.

(10) Patent No.: US 8,678,830 B2
(45) Date of Patent: Mar. 25, 2014

(54) CIRCULATORY HEART MODEL

(75) Inventors: Jonathan M. Gurdin, Merlin, OR (US);
Josiah E. Verkaik, Lompoc, CA (US)

(73) Assignee: Jonathan M. Gurdin, Merlin, OR (US)

( * ) Notice: Subject to any disclaimer, the term of this patent is extended or adjusted under 35 U.S.C. 154(b) by 0 days.

(21) Appl. No.: 13/521,418

(22) PCT Filed: Jan. 28, 2011

(86) PCT No.: PCT/US2011/022900
§ 371 (c)(1),
(2), (4) Date: Jul. 10, 2012

(87) PCT Pub. No.: WO2011/094525
PCT Pub. Date: Aug. 4, 2011

(65) Prior Publication Data
US 2012/0288840 A1 Nov. 15, 2012

Related U.S. Application Data

(60) Provisional application No. 61/299,901, filed on Jan. 29, 2010, provisional application No. 61/308,677, filed on Feb. 26, 2010.

(51) Int. Cl.
*G09B 23/28* (2006.01)
(52) U.S. Cl.
USPC .......................... 434/265; 424/262; 424/267
(58) Field of Classification Search
USPC ......... 434/262–275; 623/1.24, 1.26, 1.1, 2.42
See application file for complete search history.

(56) References Cited

U.S. PATENT DOCUMENTS

| | | | | |
|---|---|---|---|---|
| 5,632,623 A * | 5/1997 | Kolff et al. | ..................... | 434/272 |
| 5,634,797 A * | 6/1997 | Montgomery | ................ | 434/268 |
| 5,951,301 A * | 9/1999 | Younker | ........................ | 434/272 |
| 7,083,418 B2 * | 8/2006 | Baldauf | ........................ | 434/272 |
| 2005/0130107 A1 * | 6/2005 | Ellingson et al. | ............. | 434/272 |

OTHER PUBLICATIONS

Australian Examination Report dated Jun. 27, 2013 from AU application 2011210745, 3 pages, Australian Patent Office.
New Zealand Examination Report dated May 2, 2013 from NZ application 601184, 2 pages, New Zealand Intellectual Property Office.
New Zealand Acceptance dated Jul. 16, 2013 from NZ application 601184, 1 page, New Zealand Intellectual Property Office.

* cited by examiner

*Primary Examiner* — Timothy A Musselman
(74) *Attorney, Agent, or Firm* — Dennis R. Haszko

(57) ABSTRACT

A circulatory heart model (30) is disclosed that is geometrically accurate with respect to corresponding anatomical structures (31, 91, 103, 112, 124). The model (30) provides a closed loop for providing flow through the major anatomical structures (31, 91, 103, 112, 124) corresponding to a modeled biological heart. The model (30) provides a means of pumping fluid through a closed loop flow circuit analogous to the circulatory system by gripping the base of the heart model (30) and squeezing with one's hand. The transparent quality of the heart model (30) enables flow visualization including visualization of anatomical valve function through representative valves (53, 60, 69, 80). The model (3) provides high educational, scientific, and/or amusement value in a device that is economical to produce.

25 Claims, 22 Drawing Sheets

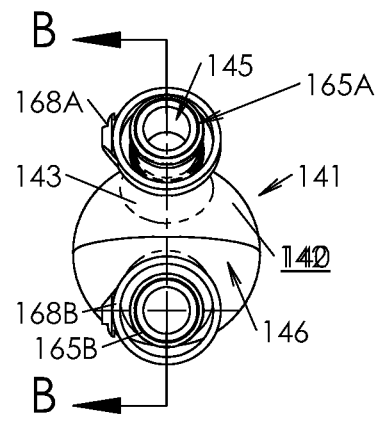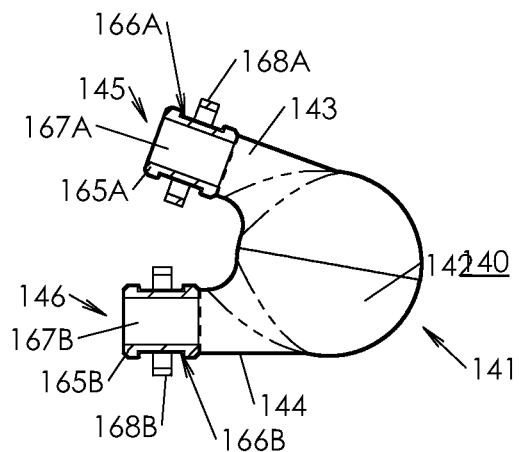
FIG.13A　　　　　　FIG.13B
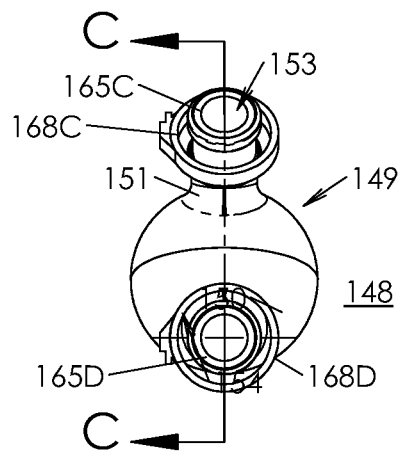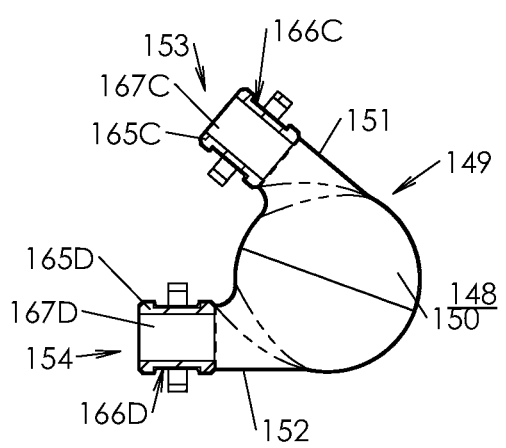
FIG.14A　　　　　　FIG.14B

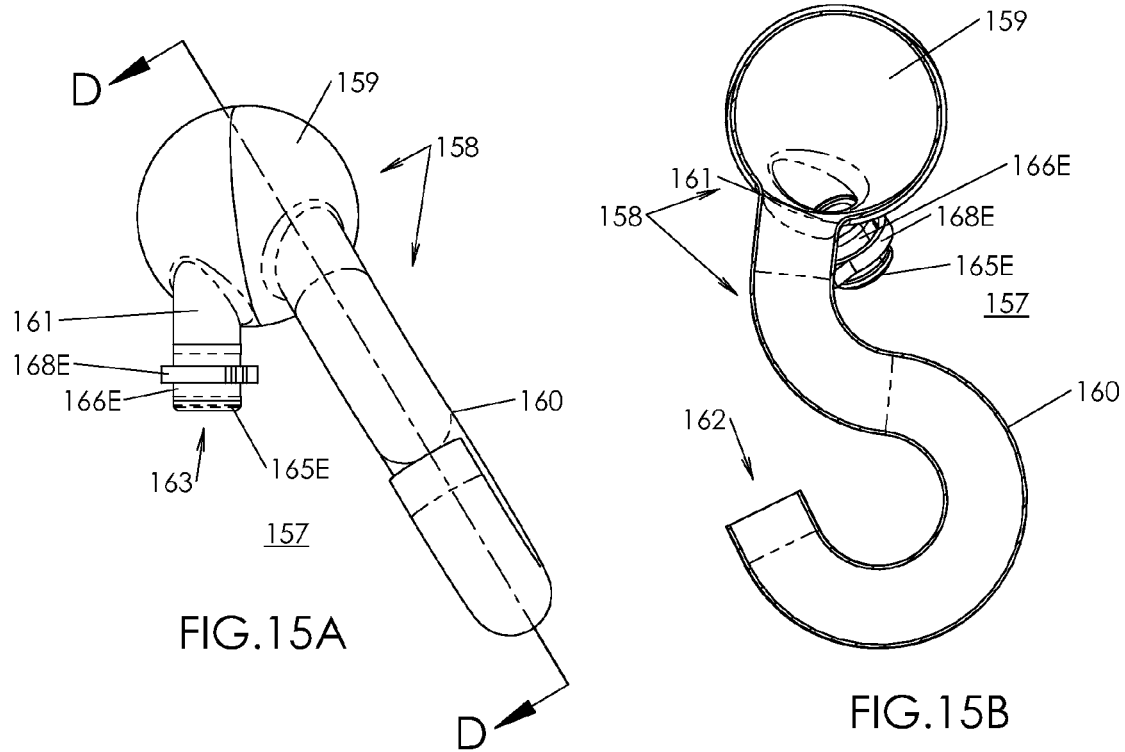
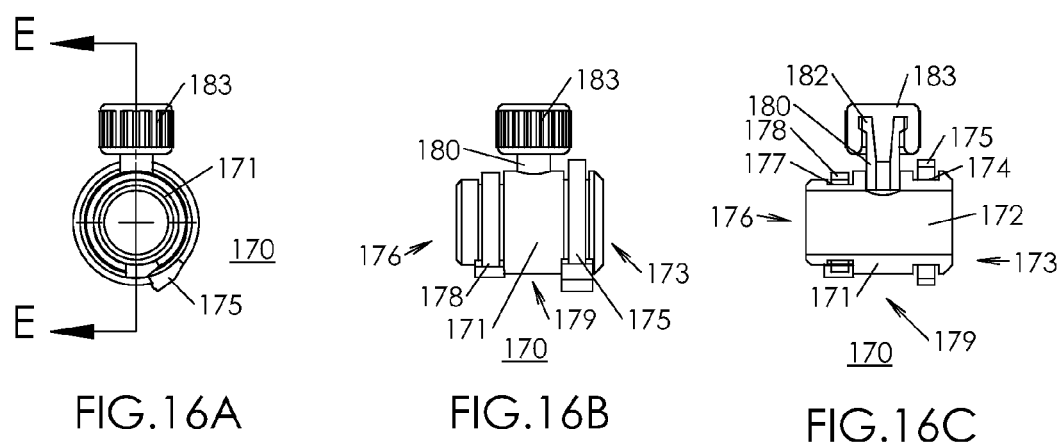

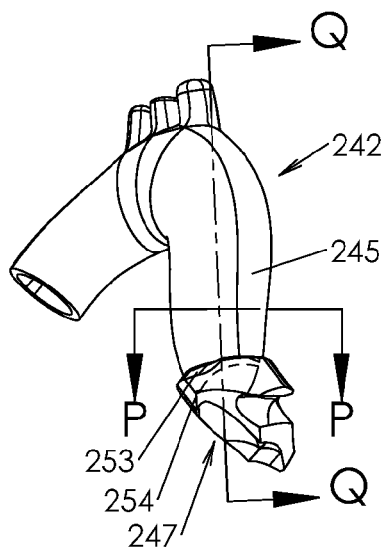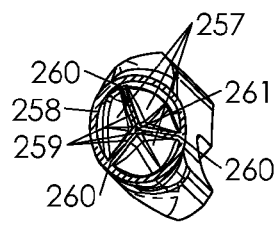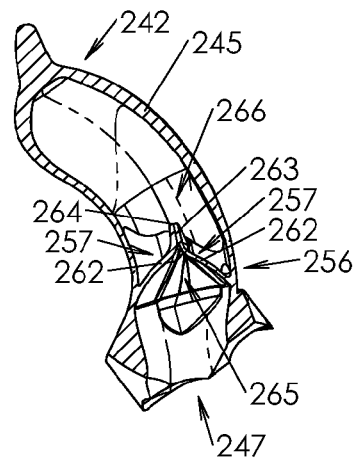
FIG. 41A  FIG. 41B  FIG. 41C
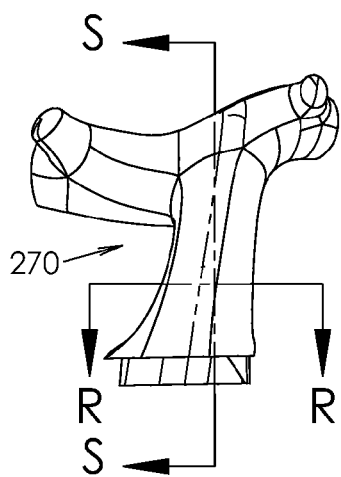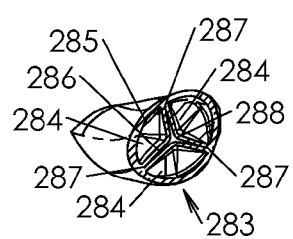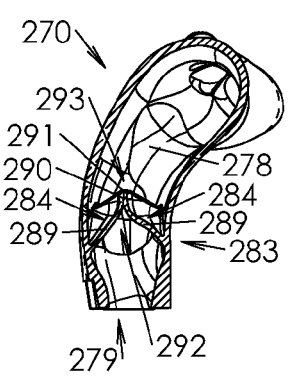
FIG. 42A  FIG. 42B  FIG. 42C

US 8,678,830 B2

CIRCULATORY HEART MODEL

CROSS-REFERENCE TO RELATED PATENT APPLICATIONS

This application claims the priority of U.S. Patent Application 61/299,901 filed Jan. 29, 2010 and U.S. Patent Application 61/308,677 filed Feb. 26, 2010.

BACKGROUND OF THE INVENTION

1. Field of the Invention

The present invention generally relates to educational, scientific, and/or amusement models. In particular, the present invention involves a working circulatory heart model that is geometrically accurate with respect to corresponding anatomical structures.

2. Background to the Invention

The human heart is one of the most intriguing organs of the human body. Although only weighing about one pound, the heart pumps about one million barrels of blood and beats 2.5 billion times in a 70-year lifetime. However as a biological pump that pumps 2,000 gallons per day, most people lack a basic understanding of the form and function of the heart including the routing of blood from and to the major vessels. Moreover, people are generally unaware of how flow is directed through the ventricles of the heart during systole and diastole and how the valves of the heart work in synch to provide directionally oriented flow through the closed circuit corresponding to the circulatory system.

Prior art models although useful in indentifying the anatomical structures of the heart, do not provide a means to simulate the pumping action of the heart including a means to displace the volume of fluid within the ventricles and to visualize fluid displacement in a way that is highly analogous to actual heart function including valve function. The present invention therefor aims at providing a physical working model of the heart that is highly analogous to an actual human heart in terms of both geometry and function as a fluid pumping system. The same design techniques and principles may be applied to additional embodiments for models of the hearts of other mammalian and non-mammalian species, as well as hearts exhibiting different medical conditions and states of health.

SUMMARY OF THE INVENTION

The present invention relates, generally to a circulatory heart model that is geometrically accurate with respect to corresponding anatomical structures and that provides a closed loop for providing flow through the major anatomical structures corresponding to the modeled biological heart. The invention provides a means of pumping fluid through a closed loop flow circuit analogous to the circulatory system by gripping the base of the heart and squeezing with one's hand. The transparent quality of the heart model enables flow visualization including visualization of valve function. The invention is directed to provide high educational, scientific, and/or amusement value in a device that is economical to produce.

According to the primary disclosed embodiment, the present invention provides a means for simulating the pumping action of the human heart including giving the user a visual and tactile indication of directionally oriented flow through a closed loop flow circuit. The apparatus enables the user to squeeze the base of the heart with various techniques and to attain resultant visual and tactile feedback.

In the most general terms the invention is a flexible liquid-filled heart model that comprises the major anatomical structures of substantial geometric accuracy.

Beyond the most general principals, the invention includes many novel features pertaining to the preferred embodiment. Perceived features and benefits of products corresponding to the present invention are:

The product would incorporate a high level of intellectual value in providing a model that is analogous to a biological heart in both form and function The product allows an observer to peer into the chambers and great vessels and gain an understanding of the internal geometry of the heart The product allows an observer to peer into and see valve placement, design and function.

The product, as configured with transparent walls and filled with particulate suspended in liquid, would enable the visualization of simulated of blood flow including fluid dynamic effects as the particulate passes through the flow path from and to the ventricles of the heart The product would be a valuable aid in the ability of a physician to inform a patient as to particular conditions effecting the heart The product would be a valuable aid in an educational setting to inform a students as to the composition, configuration and function of the heart The product as configured with various alternative geometries and structures could be a platform for visualization of particular conditions of the heart requiring medical treatment The product as augmented with implantable devices, such as a prosthetic valve, could be a valuable platform for demonstrating placement and function of a medical device assembled into the functional model.

The product as configured for repeated pumping action by hand squeezing could be marketed as stress relieving squeeze toy of high amusement value.

The product could be configured to represent hearts of different species, allowing education of comparative anatomy, or application to veterinary use.

In one format of the invention, the corresponding product could be provided as a kit for enabling a person to enjoy the learning experience and gratification of constructing the model piece by piece in building a working model of something as complex and intriguing as a heart model exhibiting circulation.

Other advantages and benefits may be possible, and it is not necessary to achieve all or any of these benefits or advantages in order to practice the invention as claimed. Therefore, nothing in the forgoing description of the possible or exemplary advantages and benefits can or should be taken as limiting.

BRIEF DESCRIPTION OF THE DRAWINGS

The novel features of the present invention, which are considered as characteristic for the invention, are set forth with particularity in the appended claims. The invention itself, however, both as to organization and methods of operation, together with further objects and advantages thereof, may best be understood by reference to the following description of a preferred embodiment of the present invention of a functional heart model, taken in conjunction with the accompanying drawings in which:

FIG. 13A is a side view of the right pulmonary reservoir component grouping according to the preferred embodiment.

FIG. 13B is a sectional view of the right pulmonary reservoir component grouping taken along section line B-B of FIG. 13A.

FIG. 14A is a side view of the left pulmonary reservoir component grouping according to the preferred embodiment.

FIG. 14B is a sectional view of the left pulmonary reservoir component grouping taken along section line C-C of FIG. 14A.

FIG. 15A is a side view of the systemic circulation and reservoir component grouping according to the preferred embodiment.

FIG. 15B is a sectional view of the systemic circulation and reservoir component grouping taken along section line D-D of FIG. 15A.

FIGS. 16A-16B are side and front views respectively of the fluid access port component grouping according to the preferred embodiment.

FIG. 16C is a sectional view of the fluid access port component grouping taken along section line E-E of FIG. 16A.

FIGS. 28-42C pertain to a second preferred embodiment of the present invention for detailing mating anatomical heart structures in an alternate configuration whereas:

FIG. 28 is a front (anterior) view of the assembly of anatomical heart structures according to the second preferred embodiment.

FIG. 29 is a rear (posterior) view of the assembly of anatomical heart structures according to a second preferred embodiment of the present invention shown in FIG. 28.

FIG. 30 is a perspective view of appendage sub-assemblies including left atrium, right atrium, aorta and pulmonary trunk according to the second preferred embodiment.

FIG. 31 shows an exploded view of component sub-assemblies of FIG. 30 in reference to their mating relationship with heart base according to the second preferred embodiment.

FIG. 32 is a perspective view of heart base oriented to the interface where anatomical configured components are connected according to the second preferred embodiment.

FIG. 33 is a perspective view of left atrium with mitral valve affixed. The view is oriented in respect to interface of attachment to heart base according to the second preferred embodiment.

FIG. 34 is a perspective view of right atrium with tricuspid valve affixed according to the second preferred embodiment. The view is oriented in respect to interface of attachment to heart base.

FIG. 35 is a perspective view of pulmonary trunk according to the second preferred embodiment. The view is oriented in respect to interface of attachment to heart base.

FIG. 41A is a perspective view of aorta with integral aortic valve according the second preferred embodiment.

FIG. 41B is a sectional view of aorta with integral aortic valve taken along section line P-P of FIG. 41A.

FIG. 41C is a sectional view of aorta with integral aortic valve taken along section line Q-Q of FIG. 41A.

FIG. 42A is a perspective view of pulmonary trunk with integrated pulmonary valve according the second preferred embodiment.

FIG. 42B is a sectional view of pulmonary trunk with integrated pulmonary valve taken along section line R-R of FIG. 42A.

FIG. 42C is a sectional view of pulmonary trunk with integrated pulmonary valve taken along section line S-S of FIG. 42A.

DETAILED DESCRIPTION

Figure 1:
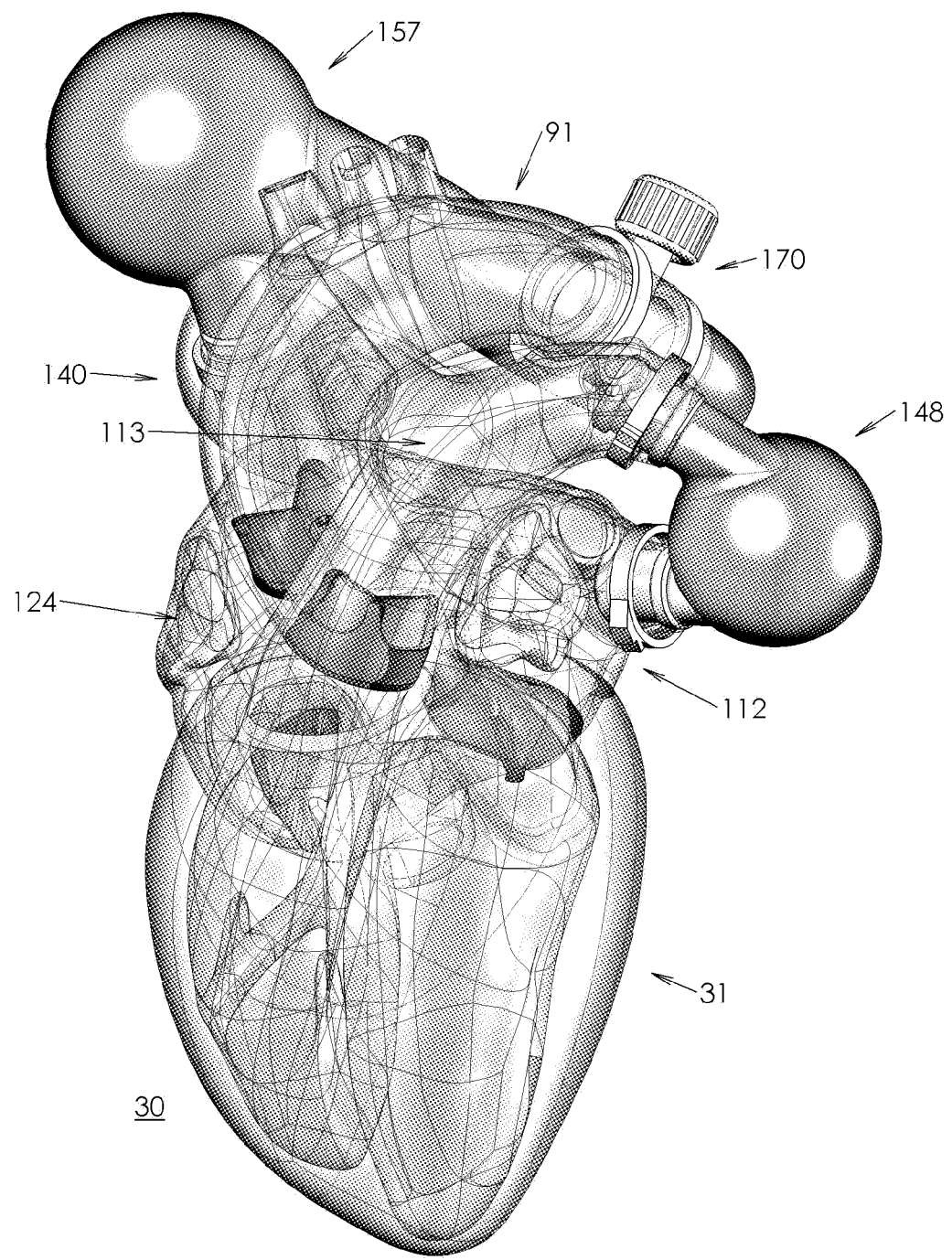
FIG. 1 is an external front view along the long axis of the heart model.

As utilized herein, terms such as "about", "approximately", "substantially" and "near" are intended to allow some leeway in mathematical exactness to account for tolerances that are acceptable in the trade as should be understood by one of ordinary skill in the art.

Before explaining the present invention in detail, it should be noted that the invention is not limited in its application or use to the details of construction and arrangement of parts illustrated in the accompanying drawings and description. The illustrative embodiment of the invention may be implemented or incorporated in other embodiments, variations and modifications, and may be practiced or carried out in various ways. Furthermore, unless otherwise indicated, the terms and expressions employed herein have been chosen for the purpose of describing the illustrative embodiment of the present invention and are not for the purpose of limiting the invention.

The aspects of invention as described herein will include reference to various anatomical structures. For the purposes of describing aspects of the invention exhibiting a high degree of correlation with the anatomical shape, orientation and position of the actual anatomical structures of the organ, the components and features of the invention are described in terms of the corresponding biological anatomical structures. Therefore any anatomical reference to a component or feature pertaining to the invention is not a literal reference to a true biological structure but a structure that exhibits a high degree similitude with the designated biological structure. For example, a rubber molding in the shape of an aorta is called "aorta" as it is a visual and functional representation of an actual aorta as part of the invention.

It will become apparent to one skilled in the art that the invention embodies both a visual and functional model of a biological heart and especially a human heart. With respect to the preferred embodiment described in detail herein, a system model of a human heart is presented as shown in the accompanying figures. A novel aspect of the invention is that the fluid filled heart model provides an indication of both form and circulatory function. The interior and exterior walls of the major anatomical vessels provided in the model are substantially accurate with respect to actual anatomical geometry. Furthermore, the major anatomical structures are a transparent pliable material, and are preferably optically clear silicone, for allowing one to peer into and visualize the substantially accurate internal geometry of the heart and the valve structures placed within.

It will also be realized from the forgoing description that the fluid-filled heart model comprises a closed loop flow circuit by which directional flow can be achieved by squeezing the base of the heart model. The ability to initiate a pumping action and to attain both a visual and tactical response is facilitated by the composition as described herein.

According to one aspect of the invention, the model is substantially accurate anatomically with respect to the major vessels of the heart and valve structures. The accurate anatomical shape, position and orientation of the geometry is ensured by deriving to a substantial extent of the geometry from an actual human heart as the basis for a generated computer (CAD) 3-D model. Developed from MRI and CT data, the source model provided true human-heart shape, with valves and vessels in accurate proportion and position.

The 3-D computer model used with respect to deriving the preferred embodiment disclosed herein is the Zygote 3.0 3-D Heart Model licensed from Zygote Media Group Inc (American Fork, Utah). However, it is not necessary to practice the invention using this as a source 3-D computer heart model, as any substantially accurate 3-D computer model of the human heart derived from accurate anatomical data using reverse engineering techniques can be used as source anatomical geometry for practicing the invention. Moreover it is possible to practice the invention by using a model derived in some other way as long as the model is characterized with a significant degree of anatomical accuracy. For example an artists rendering or physical model could possibly serve as a geometric basis for the anatomical structures according to alternative embodiments of the present invention.

For the purposes of practicing the invention, the source 3-D computer model was modified in several ways. Vessel thickness was increased as necessary to provide sufficient durability and resistance to rupture of the pressurized heart model. With respect to the heart base, the thicker ventricular walls of the model were reduced to ensure a preferred extent of pliability for enabling one to compress the ventricles without having to squeeze with excessive force. Additionally, many of the vessels were modified to comprise closed ends for the purpose of attaining a closed fluid filled system. Moreover, the shape and thickness of valves were altered so as to ensure function and improve visualization while substantially preventing back flow caused by prolapse of valves acting against moderate pressures. Thus the fluid filled heart model according to the preferred invention is anatomically accurate to the extent possible, and deviates from geometric anatomical accuracy to the extent necessary for practicing the invention.

Additional modification of the source 3-D computer heart model was directed at separating the major vessels of the heart exhibited as a single solid body, along strategic lines of separation for enabling the economic fabrication (molding) of the major vessels as independent structures that could subsequently be bonded together in forming the assembly according to the present invention.

For the purposes of providing a closed loop fluid filled system, the invention further comprises means to link the major vessels together and includes elastic reservoirs for facilitating fluid displacement and a change in volume of the heart ventricles when the base of the heart is squeezed or compressed by other means. According to the invention, one or more flow conduits and reservoirs are provided corresponding to pulmonary circulation between the pulmonary artery and left atrium and to systemic circulation between the aorta and right atrium.

Thus with the included major vessels of the heart model and the augmented structures representing both pulmonary and systemic circulation a closed system can be achieved wherein directionally oriented flow can be enabled by the incorporation of functional valves structures.

Beginning in reference to the figures starting with FIG. 1, a front view of heart model 30 is shown along the long axis of the heart. The five major anatomical vessels of the heart are provided as part of heart model 30 comprising heart base 31, left atrium 112, right atrium 124, aorta 91, and pulmonary trunk 103. Aorta bond surface 122, right atrium 124, aorta 91 and pulmonary trunk 103 are connected to heart base 31 and provide the basic framework for the flow circuit. These structures are preferably an optically clear flexible material such as a silicone or clear polyurethane. As enabled by the transparency of the major vessels, the interior including the valves can readily be visualized from the exterior. Optionally, heart base 31, left atrium 112, right atrium 124, aorta 91 and pulmonary trunk 103 are a translucent material with a tint. In an alternative embodiment each of the major vessels has a tint of different colors to improve the contrast between the vessels and facilitate identification. The anatomical vessels are adhesive bonded together along surfaces that will be shown in reference to subsequent figures.

In attention to the anatomical structures of the major vessels, other components including right pulmonary reservoir grouping 140, left pulmonary reservoir grouping 148, systemic circulation reservoir grouping 157 and fluid access port grouping 170 are provided for practicing the invention and providing a closed loop flow circuit, left pulmonary reservoir grouping 148 and systemic circulation reservoir grouping 157 are augmented to provide a fluid communication link between pulmonary trunk 103 and left atrium 112 for simulating the pulmonary circulation loop. Fluid access port grouping 170 is displaced proximal to aorta 91 as part of the flow path to provide an access port for fluid filling and pressurization of heart model 30. Systemic circulation reservoir grouping 157 is augmented to bridge a fluid communication link between fluid access port grouping 170 proximal to aorta 91 and right atrium 124 for substituting for a systemic circulation loop.

Figure 2:
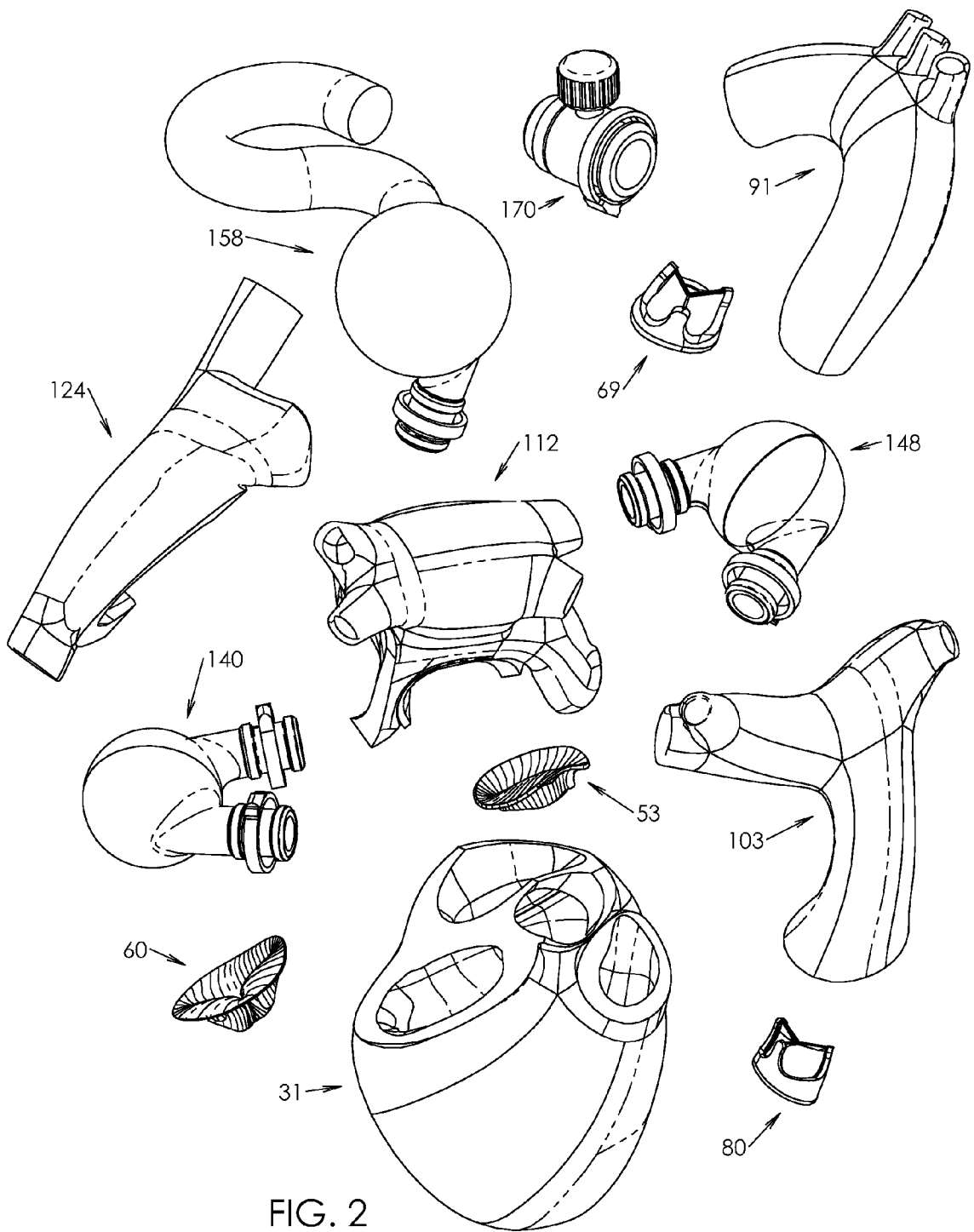
FIG. 2 is an exploded view of the anatomical structures and the other component groupings of the heart model.

FIG. 2 shows a separated view of a set of anatomical components and other component groupings used to complete the assembly of heart model 30 according to the preferred embodiment. The set comprises the five major vessels of the heart including heart base 31, aorta 91, pulmonary trunk 103, left atrium 112, and right atrium 124. The set further comprises the four valves of the heart including mitral valve 53, tricuspid valve 60, aortic valve 69 and pulmonary valve 80. The set further comprises the augmented component groupings including right pulmonary reservoir grouping 140, left pulmonary reservoir grouping 148, systemic reservoir structure 158 and fluid access port grouping 170. According to this preferred embodiment, the anatomical components are bonded together and the augmented component groupings are characterized with a clamping attachment means which will be described in reference to subsequent figures.

In one format of the invention, heart model 30 could be provided as a construction type model kit in which a person or persons could enjoy the challenge and enrichment by the educational experience of assembly of the system. Corresponding to this format of the invention, structures and component groupings could be provided separated as shown in FIG. 2. In addition to the items shown in FIG. 2, the construction type model kit according to the build-it-yourself format of the invention would preferably include additional items as part of the bill of materials. Such a kit might also include:

Bonding Adhesive (Components that require bonding would preferably be provided with primed bond surfaces to facilitate robust adhesion along bonded surfaces)

Clamping tool (such as zip tie gun)

A syringe with lure fitting for injection of fluid at injection port

Stopcock valve for connecting to fluid access port grouping 170 and for facilitating fluid injection and air bubble removal Container of particulate (such as water-density-matched microspheres) for flow visualization when mixed with fluid within heart model 30

Assembly instructions

While the major vessels of the heart are split into five components, it is not necessary to segment the anatomical structures as described in reference to the preferred embodiment to practice the invention. Although it is likely that the heart needs to be separated into at least five structures, a larger number of structures could serve for constructing the heart whereas the major vessels could further be separated into two or more sections. For example heart base 31 could be split in two whereas one molding could have a portion of the left ventricle and a second molding could have a portion of the right ventricle whereas when bonded together they would substantially form heart base 31 as described in reference to FIG. 3.

FIGS. 3A-3E illustrates heart base 31 according to the preferred embodiment which serves as the base of the device for supporting the heart model 30 in one's hands and squeezing to produce a pumping action. Heart base 31 is a pear shape structure comprising a closed end at apex 32 and an open end with orifices at superior portion 33. Heart base 31 is of a substantially accurate anatomical shape and includes anterior interventricular sulcus 34 and posterior interventricular sulcus 35 as characteristic of the human heart.

Figure 3A:
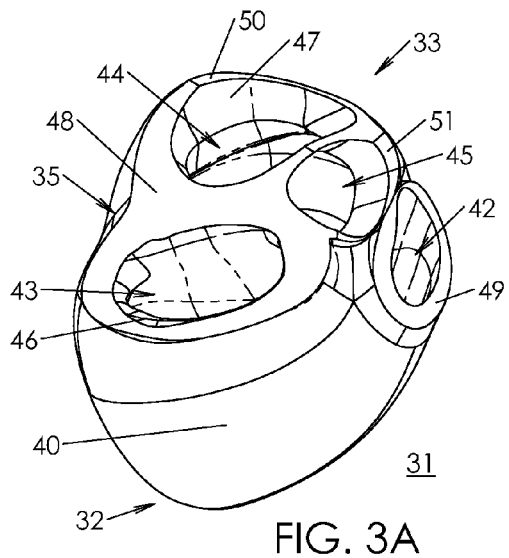
FIGS. 3A-3D are perspective, top, right side, and front views of the heart base structure according to the preferred embodiment.
Figure 3B:
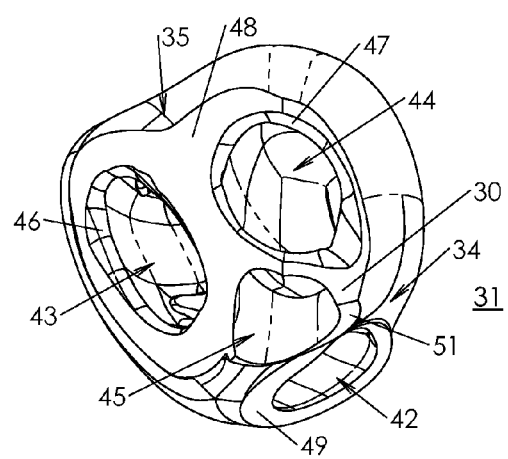
Figure 3C:
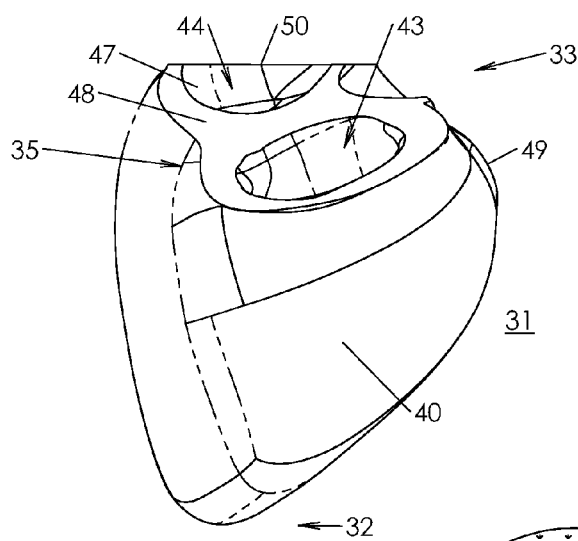
Figure 3D:
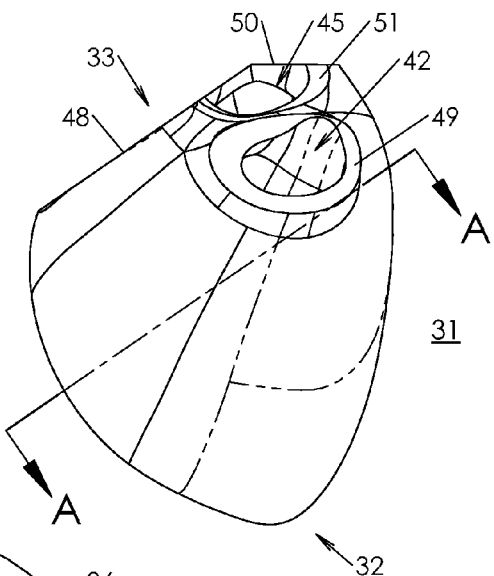
Figure 3E:
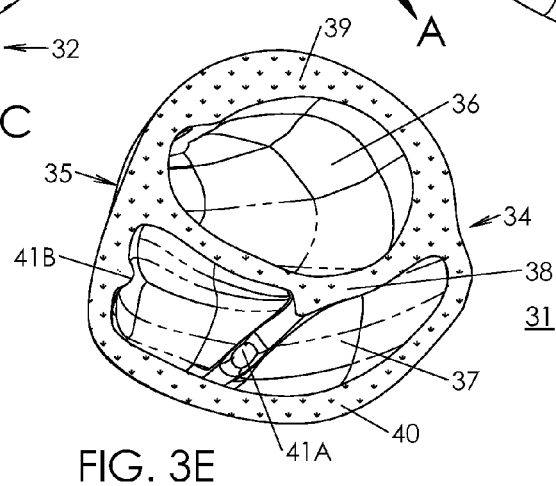
FIG. 3E is a sectional view of the heart base structure along the section line A-A of FIG. 3D.
Figure 4A:
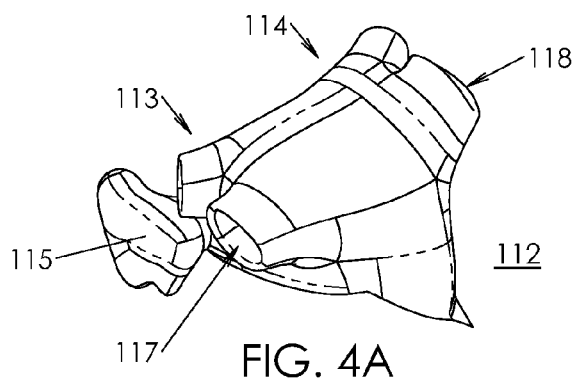
FIGS. 4A-4D are right perspective, left perspective, anterior and bottom views respectively of the left atrium component according to the preferred embodiment
Figure 4B:
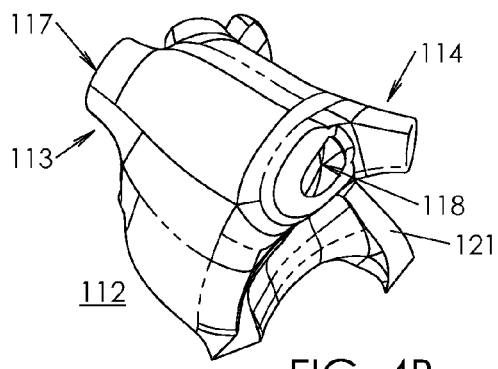
Figure 4C:
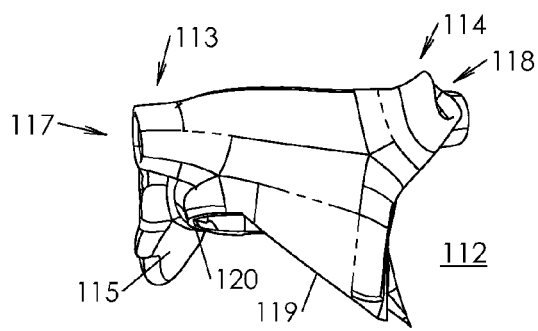
Figure 4D:
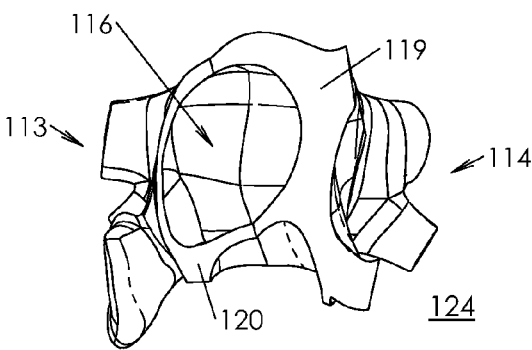

As seen in FIG. 3E, the section view taken along section line A-A of FIG. 3D, heart base 31 includes internal left ventricle 36 and right ventricle 37 adjacent to left ventricle wall 39 and right ventricle wall 40 respectively. Left ventricle 36 is separated from right ventricle 37 by intraventricular septum 38. The internal cross-sectional shape of left ventricle 36 and right ventricle 37 is substantially accurate but can vary in proportion to an extent for the purpose of attaining a preferred embodiment that is characterized without excessive wall thicknesses. For example the volume of left ventricle 36 was deliberately increased by offsetting the interior surfaces of left ventricle 36 resulting in left ventricle wall 39 and intraventricular septum 38 being narrower. Since the source 3D computer model that was more analogous to the heart in systole (contracture) it is preferred that the invention exhibit interventricular volumes more consistent with diastole (expansion).

Papillary structures were also removed from within left ventricle 36 and are optional with respect to practicing the invention. According to this preferred embodiment of heart base 31, posterior papillary structure 41A and anterior papillary structure 41B are displaced in right ventricle 37 but are not critical to practicing the invention. To improve the manufacturability and pliability of the model it is preferred to exclude papillary structures. For the purposes of attaining a higher degree of anatomical similitude it is preferred to include papillary structures.

At superior portion 33, heart base 31 comprises several orifices and surrounding bond surfaces for attachment of the other major vessels including aorta 91, pulmonary trunk 103, left atrium 112, and right atrium 124. Pulmonary orifice 42 and tricuspid orifice 43 are provided at the correct anatomical orientation for fluid communication with right ventricle 37. Mitral orifice 44 and aortic orifice 45 are provided at accurate anatomical orientations for fluid communication with left ventricle 36. Pulmonary trunk bond surface 49 is provided around pulmonary orifice 42 for bonding pulmonary trunk 103 for fluid communication thereto. Aorta bond surface 51 is provided for adhesive bonding of aorta 91 for fluid communication through aortic orifice 45. Mitral orifice 44 and left atrium bond surface 50 are provided for adhesive bonding of left atrium 112 in facilitating fluid communication through mitral orifice 44. Atrium bond surface 48 also provides a bond surface for adhesive bonding of right atrium 124 to facilitate fluid communication through tricuspid orifice 43.

Tricuspid orifice 43 and mitral orifice 44 are substantially anatomically accurate being oblong and non-symmetrical in shape and include tricuspid rim 46 and mitral rim 47 respectively whereto tricuspid valve 60 and tricuspid orifice 43 are respectively attached.

According to the preferred embodiment, heart base 31 comprises bond surfaces isolated at superior portion 33 and which are positioned substantially at the juncture with aorta 91, pulmonary trunk 103, left atrium 112, and right atrium 124. Thus there are preferably no bond lines on heart base 31 in positions where the view into right ventricle 37 and left ventricle 36 would be substantially obstructed or distorted or in positions that would further compromise the aesthetic properties of the device such as requiring a seam or parting line running from superior portion 33 to apex 32.

A significant aspect of the preferred embodiment is that the interface for bonding the aorta 91, pulmonary trunk 103, left atrium 112, and right atrium 124 to heart base 31 is of the approximate vicinity corresponding to the fibrous skeleton of a human heart including especially the left and right fibrous rings pertaining to biological mitral and tricuspid valves. Although the invention does not include a fibrous skeleton, the sectioning of the major vessels is preferably in close relation of fibrous skeleton structure corresponding to an actual human heart.

Heart base 31 is preferably a single silicone molding whereas both left ventricle 36 and right ventricle 37 are defined by core patterns supported through the mold cavity from superior portion 33. Accordingly, the core patterns necessary for molding heart base 31 are preferably segmented and separable whereas the core pattern for right ventricle 37 can be removed partially from pulmonary orifice 42 and partially from tricuspid orifice 43 and whereas the core pattern for left ventricle 36 can be removed primarily through mitral orifice 44 and also partially through aortic orifice 45 if necessary. On account of the (I) crescent shape of right ventricle 37, (II) the orientation of pulmonary orifice 42 and tricuspid orifice 43 with respect to each other, and (III) the existence of posterior papillary structure 41A that bridges across from intraventricular septum 38 to right ventricle wall 40, it is necessary that the defining core pattern comprised of at least two separable pieces for extraction both through pulmonary orifice 42 and tricuspid orifice 43. On account of more rounded geometry of left ventricle 36, it is not as critical that the corresponding core pattern for defining the internal geometry of left ventricle be of two or more separable pieces. Since aortic orifice 45 is in very close proximity to mitral orifice 44 the wall between could be temporarily severed for extraction of core pattern pertaining to left ventricle 36 thus eliminating the need for a more complex split core assembly. Thus the access to left ventricle 36 and right ventricle 37 provided by pulmonary orifice 42, tricuspid orifice 43, mitral orifice 44 and aortic orifice 45 enables heart base 31 to be economically molded as a single structure when using extractable core patterns.

FIGS. 4A-4D illustrates left atrium 112 according to the preferred embodiment. Left atrium 112 is a hollow a non-symmetrical vessel structure that is anatomically accurate with respect to geometry and comprises the primary structures of left pulmonary veins 113, right pulmonary veins 114 and left atrial appendage 115. Base opening 116 fits over mitral orifice 44 of heart base 31 whereas posterior bond surface 119 and anterior bond surface 120 are provided for adhesive bonding to atrium bond surface 48 and left atrium bond surface 50 (of heart base 31) respectively. Right atrium bond surface 121 is provided for adhesive bonding to right atrium 124. Right circular opening 117 is at left pulmonary veins 113 and left circular opening 118 is provided on right pulmonary veins 114 for fluid communication with respect to base opening 116. These openings are substantially circular for attachment of right pulmonary reservoir grouping 140 and left pulmonary reservoir grouping 148 as will be described in reference to subsequent figures. Base opening 116 is sufficiently large to allow removal of a core pattern defining the internal geometry of left atrium 112 for the purpose of molding during manufacturing. According to the preferred embodiment, the material of left atrium 112 is clear silicone of sufficient tear strength and has a minimum wall thickness at least 1 mm throughout the hollow sections of left atrium 112. If necessary to attain a minimum wall thickness, the geometry of the internal surfaces is adjusted slightly with respect to the source anatomical model.

Figure 5A:
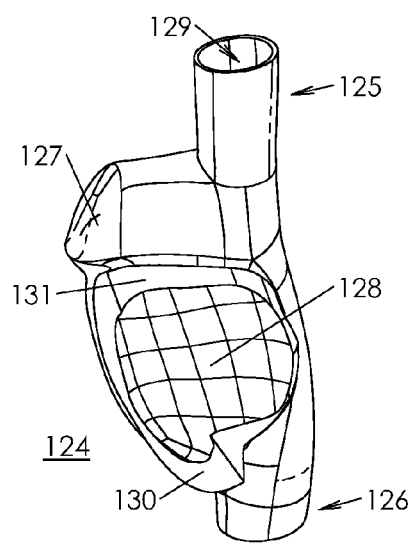
FIGS. 5A-5B are bottom and front views respectively of the right atrium component according to the preferred embodiment.
Figure 5B:
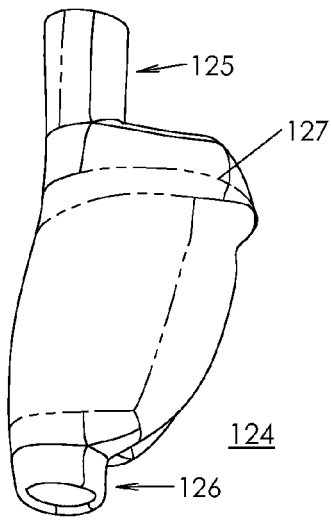

FIGS. 5A and 5B illustrate right atrium 124 according to the preferred embodiment. Right atrium 124 is a hollow vessel structure that is substantially accurate with respect to anatomical geometry and comprises the primary structures of superior vena cava 125, inferior vena cava 126 and right auricle 127. According to the preferred embodiment circular opening 129 is provided at superior vena cava 125 while inferior vena cava 126 is closed. Circular opening 129 of superior vena cava 125 is sufficiently circular for attachment of systemic circulation reservoir grouping 157 thereto. This will be further described in reference to subsequent figures. When assembled, base opening 128 fits over tricuspid orifice 43 and is adhesive bonded both to tricuspid orifice 43 and left atrium 112 along bonding surface 130 and bonding surface 31 respectively. Base opening 128 is sufficiently large for extraction of a single core pattern defining the interior geometry of right atrium 124 subsequent to molding. The internal geometry of right atrium 124 may be adjusted to the extent necessary in providing a minimum wall thickness and for improving the manufacturability of right atrium 124.

Figure 6A:
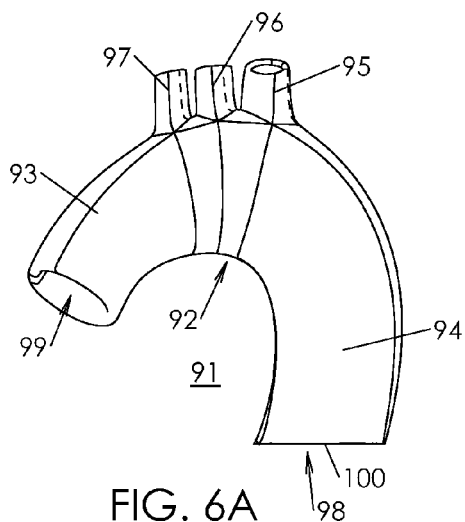
FIGS. 6A-6C are side, perspective and bottom views respectively of the aorta component according to the preferred embodiment.
Figure 6B:
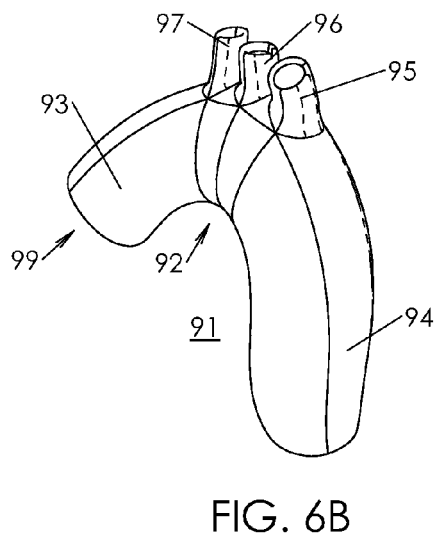
Figure 6C:
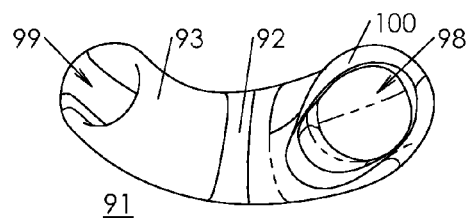

FIGS. 6A-6C shows aorta 91 according to the preferred embodiment. Aorta 91 is a vessel with a relatively large flow passage of sufficiently circular internal geometry. Aorta 91 comprises three major regions including ascending aorta 94, aortic arch 92 and descending aorta 93. Above aortic arch 92 closed trunks including brachiocephalic trunk 95, left common carotid artery 96, and left subclavian artery 97 are exhibited. Entrance opening 98 is at the end of ascending aorta 94 for assembly over aortic orifice 45 of heart base 31. Exit opening 99 at the end of descending aorta 93 and is sufficiently circular for attachment of systemic circulation reservoir grouping 157 as will be described in reference to subsequent figures. According to the preferred embodiment, bond surface 100 at end of ascending aorta 94 is of the appropriate cross-section for adhesive bending to aorta bond surface 51 (of heart base 31) and partially to a surface provided on left atrium 112 (subsequent to left atrium 112 being adhesive bonded to heart base 31). According to the preferred embodiment the internal geometry of aorta 91 deviates from actual anatomical geometry, for the most part, to the extent necessary for providing a minimum necessary wall thickness. Although aorta 91 is arched shaped, the interior geometry of aorta 91 is such that a single extractable core pattern can be used for molding.

Figure 7A:
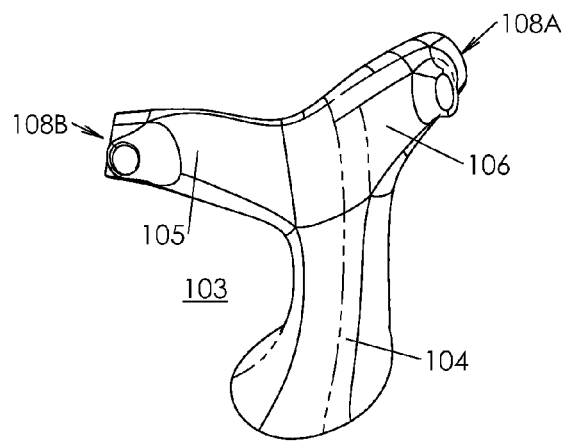
FIGS. 7A-7C are top, right side, and front views respectively of the pulmonary trunk component according to the preferred embodiment.
Figure 7B:
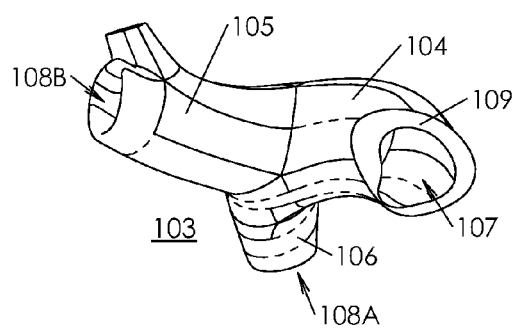
Figure 7C:
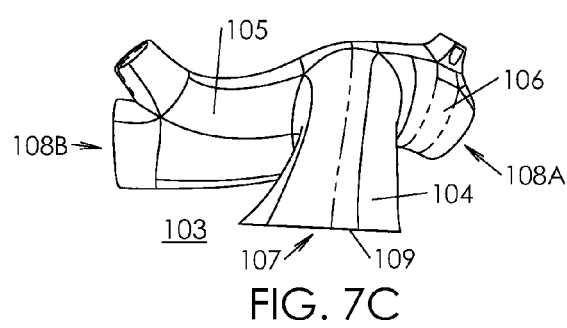
Figure 8A:
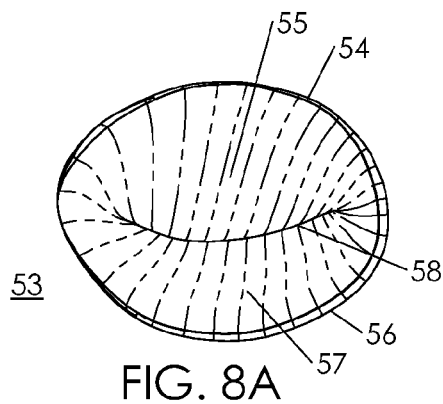
FIGS. 8A-8D are top, perspective, front and side views respectively of the mitral valve component according to the preferred embodiment.
Figure 8B:
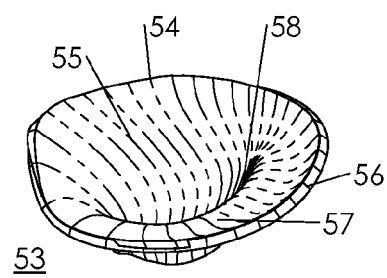
Figure 8C:
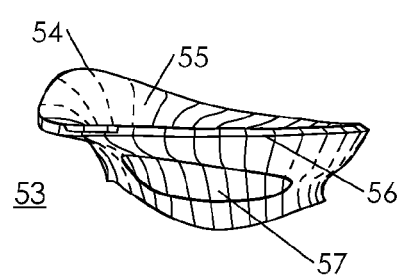
Figure 8D:
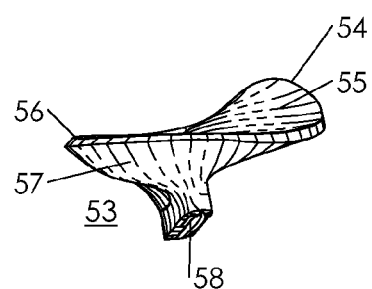
Figure 9A:
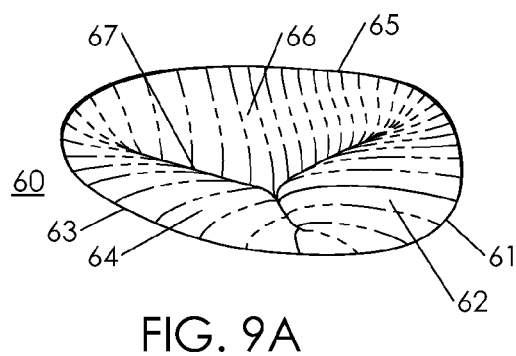
FIGS. 9A-9D are top, perspective, front and side views respectively of the tricuspid valve component according to the preferred embodiment.
Figure 9B:
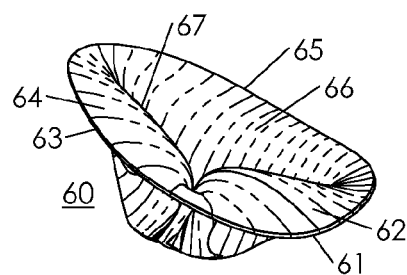
Figure 9C:
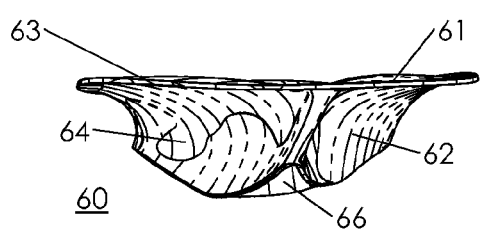
Figure 9D:
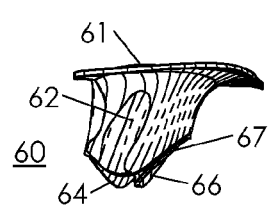
Figure 10A:
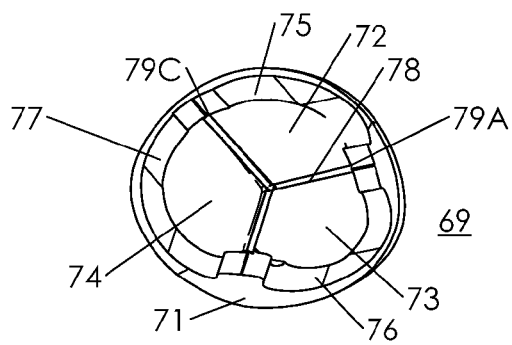
FIGS. 10A-10D are top, perspective, front, and side views respectively of the aortic valve component according to the preferred embodiment.
Figure 10B:
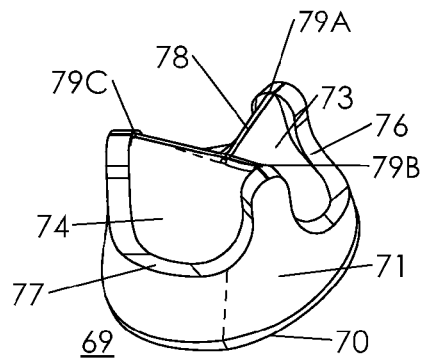
Figure 10C:
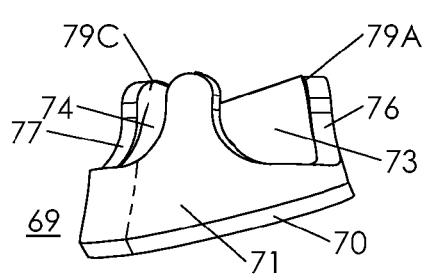
Figure 10D:
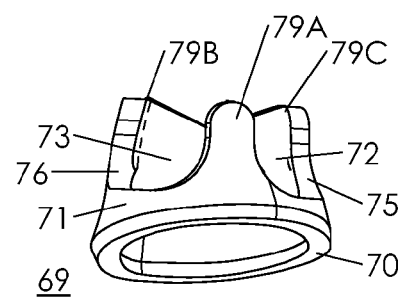
Figure 11A:
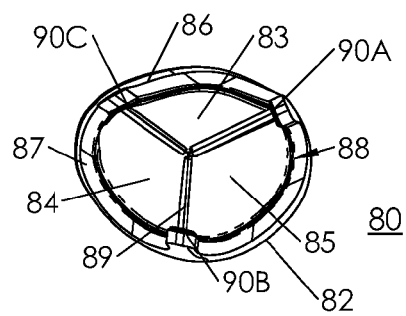
FIGS. 11A-11D are top, perspective, front, and side views respectively of the pulmonary valve component according to the preferred embodiment.
Figure 11B:
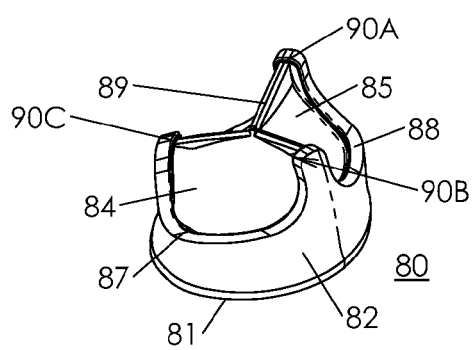
Figure 11C:
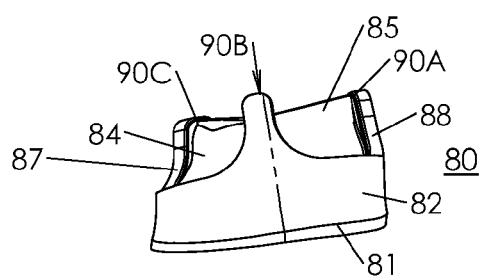
Figure 11D:
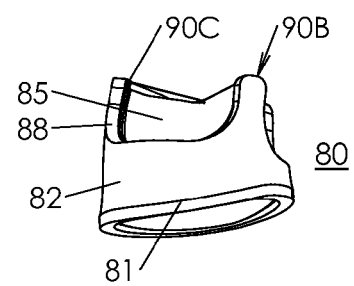

FIGS. 7A-7B shows pulmonary trunk 103 according to the preferred embodiment. Pulmonary trunk 103 is a hollow Y-shaped vessel comprising pulmonary artery 104 that branches out to right pulmonary artery 105 and left pulmonary artery 106. In the assembled configuration entrance opening 107 fits over pulmonary orifice 42 for fluid communication therein whereas bond surface 109 is adhesive bonded along pulmonary trunk bond surface 49 (of heart base 31). Exit opening 108A and exit opening 108B are provided at the ends of left pulmonary artery 106 and right pulmonary artery 105 respectively and are sufficiently circular for suitable attachment of left pulmonary reservoir grouping 148 and right pulmonary reservoir grouping 140. This will be described further in reference to subsequent embodiments. The interior geometry of pulmonary artery 104 is altered with respect to actual anatomical geometry to the extent appropriate for maintaining sufficient wall thickness and for making the component economical to manufacture. Accordingly, on account of the Y-shaped internal geometry, a core pattern used to defining the internal geometry can be a separable two-piece core for allowing the core to be extracted (i.e., removed) after molding pulmonary trunk 103. An alternative embodiment of the invention could however be that pulmonary trunk 103, as shown in reference to the preferred embodiment, is actually made from two moldings joined together to form the larger pulmonary trunk structure.

FIGS. 8A-8D shows mitral (left atrioventricular) valve 53 according to the present invention. Mitral valve 53 is an oblong shape which conforms to the geometry of mitral rim 47 of heart base 31 for bonding thereto for enclosing left ventricle 36 through mitral orifice 44. Mitral valve 53 comprises anterior annulus 54 and posterior annulus 56 which supports anterior leaflet 55 and posterior leaflet 57 respectively. Anterior leaflet 55 and posterior leaflet 57 are curved inward and separated in the central region by crescent shaped commisure 58. Although an accurate anatomical model is substantially the basis for the geometry of mitral valve 53 including especially the outward boundary of anterior annulus 54 and posterior annulus 56 as well as the curvature of anterior leaflet 55 and posterior leaflet 57, the cross-sectional thickness of anterior leaflet 55 and posterior annulus 56 has been increased with respect to a real human mitral valve for the purposes of practicing the invention using a non-biological material such as silicone or other elastomer. Preferably mitral valve 53 is silicone molding of at least 1 mm wall thicknesses.

According to the preferred embodiment, the relative increase in thickness enables mitral valve 53 to function in providing substantially unidirectional flow through commisure 58 while also providing reinforcement against prolapsed of anterior leaflet 55 and posterior leaflet 57 when acting against back pressure. Preferably mitral valve 53 is of a color that assists in recognition from the exterior of heart model 30. Anterior leaflet 55 and posterior leaflet 57 are essentially touching along commisure 58 in a nominal unstressed state. Thus posterior leaflet 57 and anterior leaflet 55 are preferably separated along commisure 58 by a slitting method after the molding of mitral valve 53.

FIGS. 9A-9D shows tricuspid (right atrioventricular) valve 60 according to the preferred embodiment. Tricuspid valve 60 is an oblong shape which conforms to the geometry of tricuspid orifice 43 (of heart base 31) for bonding thereto for enclosing right ventricle 37 through tricuspid orifice 43. As opposed to anterior annulus 54 comprising two leaflets, tricuspid valve 60 comprises three at named. Correspondingly, tricuspid valve 60 comprises anterior annulus 61, posterior annulus 63 and septal annulus 65 which supports anterior leaflet 62, posterior leaflet 64 and septal leaflet 66 respectively. Anterior leaflet 62, posterior leaflet 64, and septal leaflet 66 are curved inward and separated by commisure 67 in the central region. The thickness of the leaflets was also thickened with respect to an actual biological tricuspid valve.

Accurate anatomical geometry is substantially the basis for the shape of tricuspid valve 60 including especially the outward boundary of anterior annulus 61, posterior annulus 63, and septal annulus 65 as well as the curvature of anterior leaflet 62, posterior leaflet 64, and septal leaflet 66. As is the case with mitral valve 53, the preferred embodiment of tricuspid valve 60 is silicone as the non-biological material with a preferred wall thickness of at least 1 mm for enabling tricuspid valve 60 to function in providing substantially unidirectional flow through commisure 67 while also providing reinforcement against prolapsed of anterior leaflet 62, posterior leaflet 64, and septal leaflet 66 when acting against back pressure. Preferably, tricuspid valve 60 is of a color that assists in recognition from the exterior of heart model 30 but not necessarily the same color as mitral valve 53. As is also the case that the leaflets are touching along commisure 67 a nominal unstressed state, anterior leaflet 62, posterior leaflet 64, and septal leaflet 66 are preferably separated by slitting them apart in the central region along commisure 67 after molding.

FIGS. 10A-10D show aortic valve 69 according to the preferred embodiment. Aortic valve 69 is a tricuspid valve adapted to provide unidirectional flow through annulus 70 but to prevent retrograde flow. Aortic valve 69 comprises frame 71 for supporting posterior cusp 72, left cusp 73 and right cusp 74. The outer geometry of frame 71 is of anatomically accurate for inter-fitting within ascending aorta 94 whereas the entire outer surface of frame 71 is bonded to the inside surface of the ascending aorta 94. Frame 71 is interrupted at three positions denoted as posterior coronet 75, left coronet 76, and right coronet 77 corresponding to the orientations of posterior cusp 72, left cusp 73, and right cusp 74. The crown like formation of posterior coronet 75, left coronet 76, and right coronet 77 is of characteristic of the shape and orientation of the fibrous coronet of actual human anatomy surrounding the biological aortic valve. For the purposes of practicing the invention using rubber material that can be readily joined to aorta 91, the inner shape and thickness of posterior cusp 72, left cusp 73 and right cusp 74 has been altered with respect to actual corresponding human valve as necessary to maintain a substantial degree of functional equivalence in a construct although using a synthetic material. Thus aortic valve 69 shares in some aspects, similarity to the geometry of some prosthetic valves marketed by medical device companies for human valve replacement that share a similar shaped framework.

Posterior cusp 72 is joined to frame 71 along posterior coronet 75 from commissural junction 79C to commissural junction 79A. Left cusp 73 is joined to frame 71 along left coronet 76 from commissural junction 79A to commisure 78B. Right cusp 74 is joined to frame 71 along right coronet 77 from commissural junction 79B to commissural junction 79C. Commisure 78 extends between posterior cusp 72, left cusp 73 and right cusp 74 whereas under opening pressure differential, the cusps can be displaced with respect to each other when the direction of flow acts to push cusps apart. When under a reverse closing pressure differential, the cusps will shut against each other in preventing retrograde flow. Since posterior cusp 72, left cusp 73 and right cusp 74 are supported all the way up to commissural junction 79A, commissural junction 79B and commissural junction 79C and since outer surface of frame 71 is bonded to the inner wall of aorta 91, the cusps are substantially supported in avoiding prolapse under a normal range of operating pressures. Posterior cusp 72, left cusp 73 and right cusp 74 are of a thin wall structure to enable pliability for displacement and flow therethrough for allowing unidirectional flow but not excessively thin to tear under normal operating pressures acting counter to the valve. Posterior cusp 72, left cusp 73, and right cusp 74 are molded as joined and then separated by slitting along commisure 78 after molding.

FIGS. 11A-11D show pulmonary valve 80 according to the preferred embodiment. Pulmonary valve 80 is a tricuspid valve adapted to provide directional flow through annulus 81 but to prevent retrograde flow. Pulmonary valve 80 comprises frame 82 for supporting left cusp 84, right cusp 85 and anterior coronet 86. The outer geometry of frame 82 is of anatomically accurate for inter-fitting within pulmonary artery 104 of pulmonary trunk 103 whereas the entire outer surface of frame 82 is bonded to the inside surface of the pulmonary trunk 103. Frame 82 is interrupted at three positions comprising left coronet 87, right coronet 88 and commisure 89 corresponding to the orientations of left cusp 84, right cusp 85, and anterior coronet 86. The crown like formation of left coronet 87, right coronet 88, and commisure 89 is characteristic of the shape and orientation of the fibrous coronet of actual human anatomy surrounding the pulmonary valve.

For the purposes of practicing the invention using rubber material that can be readily joined to 103, the inner shape and thickness of left cusp 84, right cusp 85 and anterior coronet 86 had been altered with respect to actual corresponding human valve as necessary to maintain a substantial degree of functional equivalence in a construct using synthetic material. Thus pulmonary valve 80 shares in some aspects, similarity to the geometry of some prosthetic pulmonary valves marketed by medical device companies for human valve replacement that comprise a similar shaped framework.

Anterior cusp 83, left cusp 84 and right cusp 85 are joined to pulmonary valve 80 along anterior coronet 86 from commisure junction 90C to commisure junction 90A. Left cusp 84 is joined to pulmonary valve 80 along left coronet 87 from commisure junction 90B to commisure junction 90C. Right cusp 85 is joined to pulmonary valve 80 along right coronet 88 from commisure junction 90A to commisure junction 90B. Commisure 89 extends between anterior cusp 83, left cusp 84 and right cusp 85 whereas under the cusps can be displaced with respect to one another under fluid opening pressure differential acting to push cusps apart. When under a reverse closing pressure differential, the cusps will shut against each other in substantially preventing retrograde flow. Since anterior cusp 83, left cusp 84, and right cusp 85 are supported all the way up to commisure junction 90A, commisure junction 90B and commisure junction 90C and since outer surface of frame 82 is bonded to the inner wall of pulmonary trunk 103 according to the preferred embodiment, the cusps are substantially supported in avoiding prolapse under a normal range of operating pressures.

Anterior cusp 83, left cusp 84, and right cusp 85 are of a thin wall structure to enable pliability for displacement and flow there through for allowing unidirectional flow but not excessively thin to tear under normal operating pressures acting counter to the valve. Anterior cusp 83, left cusp 84, and right cusp 85 are preferably molded as joined together and then separated by forming a slit along commisure 89.

Figure 12:
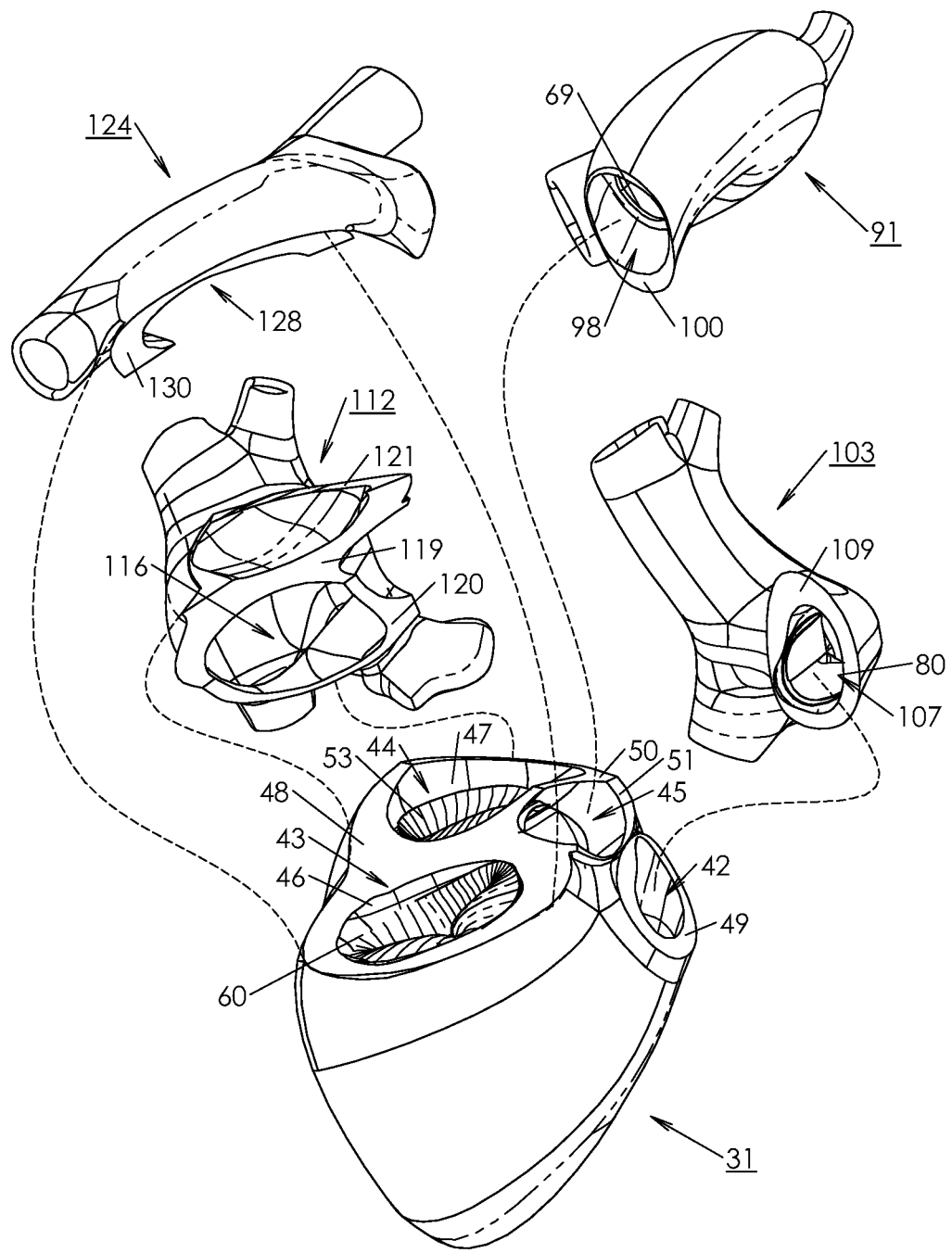
FIG. 12 is an exploded view of the primary anatomical vessels and valves according to the preferred embodiment including the heart base subassembly, left atrium, right atrium, aorta subassembly and pulmonary subassembly.

FIG. 12 shows an exploded view of the major vessels aorta 91, pulmonary trunk 103 left atrium 112 and right atrium 124 as separated from heart base 31 prior to assembly of the device according to the preferred embodiment. The four valves including mitral valve 53, tricuspid valve 60 aortic valve 69 and pulmonary valve 80 are shown in their respective positions as bonded to the respective vessels where as aortic valve 69 is attached to aorta 91 within entrance opening 98, pulmonary valve 80 is attached to pulmonary trunk 103 within entrance opening 107, mitral valve 53 is attached to heart base 31 within mitral orifice 44 along mitral rim 47, and tricuspid valve 60 is attached to heart base 31 within tricuspid orifice 43 along tricuspid rim 46. Preferably the anatomically accurate structures of valves and major vessels are of a similar material such as silicone although they may be of differing hardness.

The preferred sequence of assembly subsequent to attachment of valves is (I) attachment of left atrium 112 having aligned base opening 116 over mitral orifice 44 (II) attachment of right atrium 124 having aligned base opening 128 over tricuspid orifice 43 (III) attachment of aorta 91 having aligned entrance opening 98 over aortic orifice 45, and (IV) attachment of pulmonary trunk 103 having aligned entrance opening 107 over pulmonary orifice 42.

Left atrium 112 is adhesive bonded to heart base 31 whereas posterior bond surface 119 and anterior bond surface 120 of left atrium 112 are mated with atrium bond surface 48 and left atrium bond surface 50 respectively of heart base 31. A sufficient amount of adhesive is applied to the surfaces for a fluid tight seal when cured. Base opening 128 is adhesive bonded to heart base 31 whereas bonding surface 130 of right atrium 124 is mated with atrium bond surface 48 of heart base 31. A bond surface of right atrium 124 is also joined to the side of left atrium 112 along right atrium bond surface 121 with a sufficient adhesive applied to the surfaces for a fluid tight seal when cured. Aorta 91 is adhesive bonded to heart base 31 whereas bond surface 100 of aorta 91 is joined to aorta bond surface 51 of heart base 31 and partially to a bond surface (not shown) on the side of left atrium 112. Pulmonary trunk 103 is joined to heart base 31 whereas bond surface 109 of pulmonary trunk 103 is joined to pulmonary trunk bond surface 49 of heart base 31.

All the anatomically accurate structures are preferably silicone according to the preferred embodiment. The adhesive used to join the structures is preferably a clear silicone adhesive with a high strength, high adhesion and low viscosity. Preferably the bond surfaces are first cleaned and primed with a silicone primer prior to applying adhesive.

FIGS. 13A-13B shows right pulmonary reservoir grouping 140 according to the preferred embodiment whereas FIG. 13B is a cross-sectional view taken along section line B-B of FIG. 13A. Right pulmonary reservoir grouping 140 is a set of components including right pulmonary reservoir structure 141, clamp support fitting 165A, clamp support fitting 165B, miniature zip tie 168A, and miniature zip tie 168B for enabling a fluid tight conduit bridging between right pulmonary veins 114 of left atrium 112 and right pulmonary artery 105 of pulmonary trunk 103 and for providing an expandable reservoir within the flow circuit analogous to pulmonary circulation through the right lung. As shown, the main portion of right pulmonary reservoir structure 141 is spherical portion 142 whereas conduit portion 143 and conduit portion 144 intersect to one side extending to circular opening 145 and circular opening 146 respectively. The spacing of conduit portion 143 with respect to conduit portion 144 is matched to the spacing between right pulmonary veins 114 of left atrium 112 and right pulmonary artery 105 of pulmonary trunk 103.

Right pulmonary reservoir structure 141 is a thin walled elastic structure made of a high elongation material such as latex. Accordingly, right pulmonary reservoir structure 141 can be manufactured as a dip molding using high strength latex such as used to make catheter balloons whereas the spherical portion of the mandrel can be extracted from within either circular opening 145 or circular opening 146 as the elongation latex is approximately 800%. The preferred thickness of right pulmonary reservoir structure 141 is approximately 0.020 inch (0.5 mm). Although right pulmonary reservoir structure 141 is shown having spherical portion as being a reservoir, according to an alternative embodiment, the main body of reservoir would preferably be shaped as a right lung and perhaps have graphics on the surface analogous to a lung.

According to the preferred embodiment shown, a clamp means is used to secure right pulmonary reservoir structure 141 to left atrium 112 and pulmonary trunk 103 in providing a fluid tight seal. Clamp support fitting 165A is tubular rigid component, preferably a clear plastic, characterized with radial groove 166A on exterior and lumen 167A on interior. Clamp support fitting 165A is adapted to fit within conduit portion 143 of right pulmonary reservoir structure 141 near circular opening 145. Right pulmonary reservoir structure 141 is in turn inserted into exit opening 108B of pulmonary trunk 103 for attachment thereto whereas a thin layer of pulmonary trunk is directed over clamp support fitting 165A along exterior of conduit portion 143. Miniature zip tie 168A is used to clamp down on the overlapping structures and provide a compressive load through the overlapping structures against clamp support fitting 165A for providing a robust fluid tight seal.

In like manner conduit portion 144 of right pulmonary reservoir structure 141 is attached to right pulmonary veins 114 of left atrium 112 whereas clamp support fitting 165B is provided near circular opening 146 and is a tubular rigid material characterized with circular opening 146B on exterior and lumen 167B. Conduit portion 144 is directed over exterior of clamp support fitting 165B and for overlapping with right pulmonary veins 114 of left atrium 112 around left circular opening 118.

FIGS. 14A-14B shows left pulmonary reservoir grouping 148 according to the preferred embodiment whereas FIG. 14B is a cross-sectional view taken along section line C-C of FIG. 14A. Like right pulmonary reservoir grouping 140, left pulmonary reservoir grouping 148 is a set of components including left pulmonary reservoir structure 149, clamp support fitting 165C, clamp support fitting 165D, miniature zip tie 168C, and miniature zip tie 168D for enabling a fluid tight conduit bridging between left pulmonary veins 113 of left atrium 112 and left pulmonary artery 106 of pulmonary trunk 103 and for providing an expandable reservoir within the flow circuit analogous to pulmonary circulation through the left lung. The main portion of left pulmonary reservoir structure 149 is spherical portion 150 whereas conduit portion 151 and conduit portion 152 intersect to one side extending to opening 153 and opening 154 respectively. The spacing of conduit portion 151 with respect to conduit portion 151 is matched to the spacing between left pulmonary veins 113 of left atrium 112 and left pulmonary artery 106 of pulmonary trunk 103.

Like right pulmonary reservoir structure 141, left pulmonary reservoir structure 149 is a thin-walled elastic structure made of a high elongation material such as latex. Accordingly, left pulmonary reservoir structure 149 can be manufactured as a dip molding using high strength latex such as used to make catheter balloons whereas the spherical portion of the mandrel can be extracted from within either opening 153 or opening 154 since the elongation of latex is approximately 800%. The preferred thickness of left pulmonary reservoir structure 149 is approximately 0.020 inch (0.5 mm). Although left pulmonary reservoir structure 149 is shown having spherical portion as being a reservoir, according to an alternative embodiment, the main body of reservoir would preferably be shaped as a left lung and perhaps have graphics on the surface analogous to a lung.

Clamp means is used to secure left pulmonary reservoir structure 149 to left atrium 112 and pulmonary trunk 103 in providing a fluid tight seal. Clamp support fitting 165C is tubular rigid component, preferably a clear plastic, characterized with radial groove 166C on exterior and lumen 167C on interior. Clamp support fitting 165C is adapted to fit within conduit portion 151 of left pulmonary reservoir structure 149 near opening 153. Conduit portion 151 is in turn inserted into exit opening 108A of pulmonary trunk 103 for attachment thereto whereas a thin layer pulmonary truck 103 is directed over 155A along exterior of conduit portion 151. Miniature zip tie 168C is used to clamp down on the overlapping structures and provide a compressive load through the overlapping structures against clamp support fitting 165C for providing a robust fluid tight seal.

In like manner, conduit portion 151 of left pulmonary reservoir structure 149 is attached to left pulmonary veins 113 of left atrium 112 whereas clamp support fitting 165D is provided near conduit portion 151 and is a tubular rigid material characterized with radial groove 166D on exterior and lumen 167D. Conduit portion 151 is directed over exterior of clamp support fitting 165D and when overlapping with left pulmonary veins 113 of left atrium 112 around right circular opening 117 and is secured with miniature zip tie 168D using a zip tie gun.

FIGS. 15A-15B show systemic circulation reservoir grouping 157 according to the preferred embodiment whereas FIG. 15B is a cross-sectional view taken along section line D-D of FIG. 15A. Systemic circulation reservoir grouping 157 is a set of components including systemic reservoir structure 158, clamp support fitting 165E and lumen 167E for enabling a fluid tight conduit bridging between superior vena cava 125 of right atrium 124 and conduit coupling end 176 of fluid access port grouping 170 and for providing an expandable reservoir within the flow circuit analogous to systemic circulation exiting the aorta and entering the right atrium.

The main enlarged reservoir portion of systemic reservoir structure 158 is spherical portion 159 whereas conduit portion 160 and conduit portion 161 intersect spherical portion 159 in the positions shown. As seen in the orientation of FIG. 15A, conduit portion 161 intersections spherical portion 159 in a configuration that is substantially parallel to a central plane of spherical portion 159 but offset from the center plain. Conduit portion 161 is relatively short for supporting systemic circulation reservoir grouping 157 in close proximity above inferior vena cava 126 of right atrium 124. Conduit portion 160 is a relatively long conduit which forms a path from fluid access port grouping 170 coupled to the aorta to systemic reservoir structure 158 as will be more apparent in reference to subsequent figures. With respect to the orientation shown in FIG. 15A, conduit portion 160 preferably forms a curved path substantially along a plane that is inclined approximately in the range thirty to sixty degrees with respect to conduit portion 161.

Systemic reservoir structure 158 is a thin-walled elastic enclosed structure made of a high elongation material such as latex with circular opening 163 and circular opening 162 at ends of conduit portion 161 and conduit portion 160 respectively. Accordingly, systemic reservoir structure 158 can be manufactured as a dip molding using high strength latex such as used to make catheter balloons whereas the spherical portion of the mandrel can be extracted through circular opening 163 by passage within conduit portion 161 whereas the elongation of latex is approximately 800%. The preferred thickness of systemic reservoir structure 158 is approximately 0.020 inch (0.5 mm). Optionally graphics are included on systemic reservoir structure 158 designating systemic circulation such as an outline of a human body.

In like manner to the clamping means as described in reference to right pulmonary reservoir grouping 140 and left pulmonary reservoir grouping 148, systemic circulation reservoir grouping 157 comprises similar components for attachment of conduit portion 161 to superior vena cava 125 of right atrium 124 whereas clamp support fitting 165E is provided near circular opening 163 and is a tubular rigid material characterized with radial groove 166E on exterior and lumen 167E. Conduit portion 161 is directed over exterior of clamp support fitting 165E and overlaps with superior vena cava 125 of right atrium 124 around circular opening 129 of right atrium 124 and is secured with miniature zip tie 168E using a zip tie gun.

FIG. 16A-16C shows fluid access port grouping 170 according to the preferred embodiment which provides a fluid access port for fluid filling, removal of air bubbles and pressurization once heart model 30 is completely assembled. Components shown in fluid access port grouping 170 include port adaptor 171 (interconnected to lure fitting 180), zip tie 175, zip tie 178 and lure cap 183 which can be removed and reattached to lure fitting 180.

Port adaptor 171 is a tubular structure that is both clear and rigid comprising lumen 172, radial groove 174 at exterior of aorta coupling end 173, radial groove, 177 at exterior of conduit coupling end 176 and mid section 179 where in lure fitting 180 is affixed in a "T" configuration having a lumen for fluid communication to lumen 172. Aorta coupling end 173 is adapted for coupling to descending aorta 93 of aorta 91 at exit opening 99 and is preferably of an outside diameter matching exit opening 99 of aorta 91. Port adaptor 171 is adapted for coupling to conduit portion 160 of systemic circulation reservoir grouping 157 at circular opening 162 and preferably is of an outside diameter matching circular opening 162 of systemic circulation reservoir grouping 157. Zip tie 175 and zip tie 178 are provided as a clamping for securing flexible portions aorta 91 and systemic circulation reservoir grouping 157 thereto against port adaptor 171 for creating a robust fluid tight seal. Lure fitting 180 as attached to port adaptor 171 comprises lure thread 182 to which lure cap 183 can be attached and removed for fluid communication within lumen 172 and thus within all the vessels of heart model 30.

Lure thread 182 of lure fitting 180 also permits attachment of a syringe (not shown) or stopcock type valve (not shown) thereto whereas a syringe with a lure fitting tip is preferably utilized for injecting fluid into heart model 30 and whereas the stopcock valve with lure fitting can be utilized to temporally remove syringe for refilling syringe and for removing air bubbles from system.

Now that the components and sub-assemblies have been described in detail, heart model 30 will be described in reference to FIGS. 17-27 which show various views of the fully assembled configuration. Heart model 30 comprises anatomically correct major vessels of the heart including heart base 31, aorta 91, pulmonary trunk 103, left atrium 112, and right atrium 124 that are all transparent according to the preferred embodiment. The bond lines between these structures can be seen in FIGS. 17-27 whereas aorta 91 is attached to heart base 31 along base-aorta bond line 133, Pulmonary trunk 103 is attached to heart base 31 along base-pulmonary trunk bond line 134, left atrium 112 is attached to heart base 31 along base-right atrium bond line 135A and base-right atrium bond line 135B, and right atrium 124 is attached to heart base 31 along base-left atrium bond line 136 and is attached to left atrium 112 along left atrium-right atrium bond line 137. Additional adhesive is preferably added on the exterior along external seems within gaps between aorta 91, pulmonary trunk 103, left atrium 112, right atrium 124 to provide reinforcement to the extent possible without obstructing the view.

In addition to the anatomical heart vessels, heart model 30, includes non-anatomical vessels of right pulmonary reservoir structure 141, left pulmonary reservoir structure 149, systemic circulation reservoir grouping 157 and port adaptor 171 for enabling an enclosed fluid filled system for circulation in a closed loop. According to the preferred embodiment, right pulmonary reservoir structure 141 and left pulmonary reservoir structure 149 are interconnected between pulmonary trunk 103 and left atrium 112 as a substitute for pulmonary flow loops to and from the lungs. With respect to right pulmonary reservoir structure 141, conduit portion 143 is connected to right pulmonary artery 105 of pulmonary trunk 103 and conduit portion 144 is connected to right pulmonary veins 114 of left atrium 112. With respect to left pulmonary reservoir structure 149, conduit portion 151 is connected to left pulmonary artery 106 of pulmonary trunk 103 and conduit portion 151 is connected to left pulmonary veins 113 of left atrium 112. Correspondingly fluid will pass through spherical portion 142 and spherical portion 150 of right pulmonary reservoir structure 141 and left pulmonary reservoir structure 149 respectively when heart model 30 is compressed by squeezing heart base 31 and fluid is expelled from right ventricle 37. With the system fully pressurized and leek tight, both spherical portion 142 and spherical portion 150 will expand when heart base 31 is compressed and will help compensate for the displacement of fluid volume.

Systemic reservoir structure 158 and port adaptor 171 serve as conduits which substitute for a systemic flow loop to and from the body whereas conduit portion 151 is connected to descending aorta 93 of aorta 91 and corresponding to systemic reservoir structure 158, conduit portion 160 is connected to port adaptor 171 and conduit portion 161 is connected to superior vena cava 125 of right atrium 124. Correspondingly fluid will pass through spherical portion 159 of systemic reservoir structure 158 when heart model 30 is compressed by squeezing heart base 31 by hand or other means and fluid is expelled from left ventricle 36. With the system fully pressurized, and leek tight spherical portion 159 of systemic reservoir structure 158 will expand when heart base 31 is compressed and will help compensate for the displacement of fluid.

Spherical portion 159 is preferably approximately the combined volume of spherical portion 142 and spherical portion 150 of right pulmonary reservoir structure 141 and left pulmonary reservoir structure 149 since, according to the preferred embodiment shown, the systemic circulatory loop comprises only one reservoir whereas the pulmonary loop has two. As a general principle in practicing the invention, the volume of elastic structures in the pulmonary loop should be approximately equal to the volume provided by elastic structures in the systemic loop.

According to an alternative preferred embodiment (not shown), two loops are provided as a substitute for systemic circulation whereas one systemic loop would provide fluid communication between descending aorta 93 of aorta 91 and inferior vena cava 126 of left atrium 112 and another systemic loop would provide fluid coupling between superior vena cava 125 of right atrium 124 and one or more of the combination of brachiocephalic trunk 95, left common carotid artery 96, left subclavian artery 97 of aorta 91.

Accordingly, the alternative embodiment of having the two systemic flow loops would have the advantage of being more analogous to the human circulatory system whereas descending aorta 93 of aorta 91 supplies oxygenated blood to the lower part of the body and inferior vena cava 126 of left atrium 112 receives deoxygenated blood from the lower body and whereas brachiocephalic trunk 95, trunk, left common carotid artery 96, and left subclavian artery 97 of aorta 91 provides oxygenated blood to the upper body and superior vena cava 125 of right atrium 124 receives deoxygenated blood from the upper body. Numerous other embodiments can be practiced within the scope of the invention incorporating alternative routing schemes of simulating both pulmonary and systemic circulation comprising one or more flow loops connecting pulmonary trunk 103 to left atrium 112 and connecting aorta 91 to right atrium 124.

The preferred embodiment, as shown in FIGS. 17-27, has the advantage that the systemic circulation provided by systemic reservoir structure 158 does not interfere with one gripping by hand heart base 31 and applying compression thereto. Although not as analogous as it might be with two systemic flow loops, the shown configuration is beneficial in that the view is not obstructed within the anatomically accurate vessels heart base 31, aorta 91, pulmonary trunk 103, left atrium 112, and right atrium 124 to the extent that it would be if a conduit was routed to and connected to inferior vena cava 126 of right atrium 124. Thus there is cause for a preference in practicing the invention whereas inferior vena cava 126 is plugged and does not provide a secondary opening in right atrium 124.

There is also cause for a preference in practicing the invention whereas brachiocephalic trunk 95, left common carotid artery 96, left subclavian artery 97 of aorta 91 are enclosed as consistent with the embodiment shown so as to minimize the complexity of augmented structures in making the invention more economical to produce and for the purposes of making the invention as condensed as possible whereas adding conduits extending upward from aorta 91 would have the potential drawback of heart model 30 being too "top heavy" whereas augmented structures might more readily flop around.

Furthermore, since the average heart weighs approximately one pound, it is desirous not to greatly exceed this weight in providing a device that has the "feel" of the heart, in correct proportions, and of approximately similar mass while also exhibiting unidirectional flow through a closed loop as analogous to heart function. Thus the preferred embodiment shows the invention in a form wherein the anatomical structures are emphasized and wherein augmented structures substituting for pulmonary and systemic flow are displaced in close proximity to the anatomical structures. Moreover, the reservoirs are only as large as necessary for desired function of the device without having to apply excessive pressure in actuating the device.

It should also be noted for the purposes of practicing the invention that the heart model need not be of the same scale as the anatomical structures being molded. Various embodiments could be of a larger scale or smaller scale whereas the proportions of the major vessels with respect to each other would remain substantially equivalent.

According to the preferred embodiment, particulate (not shown) is added to a clear fluid such as water to enable visualization of flow direction and effects through the anatomical structures. A preferred type of particulate is microspheres of the specific gravity of 1 g/cc (being of the same density of water) and are of a clearly visible color and are of the size of 0.1 to 1.0 mm diameter. Specific gravity of 1 g/cc ensures that particles do not settle to the bottom or float to the top when added to water. Suspension of microspheres in water enables numerous applications, including the visualization and characterization of fluid flow. Colored microspheres with specific gravity of 1 g/cc designed for optimum suspension of microspheres in water are available from Cospheric, LLC (Santa Barbara, Calif.).

Figure 17:
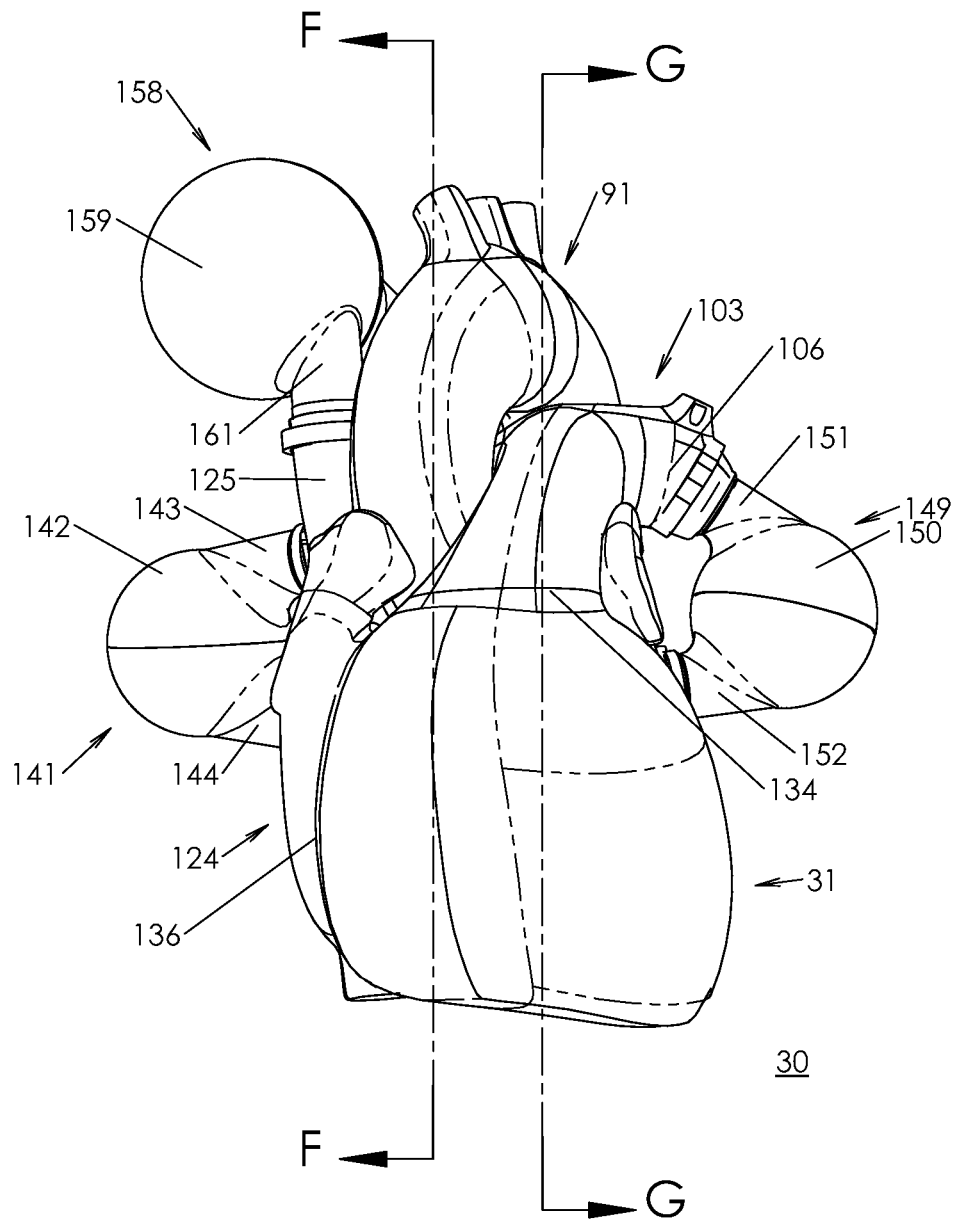
FIG. 17 is an anterior view of the fully assembled heart model according to the preferred embodiment corresponding to the orientation of the human heart as supported in the chest.
Figure 18:
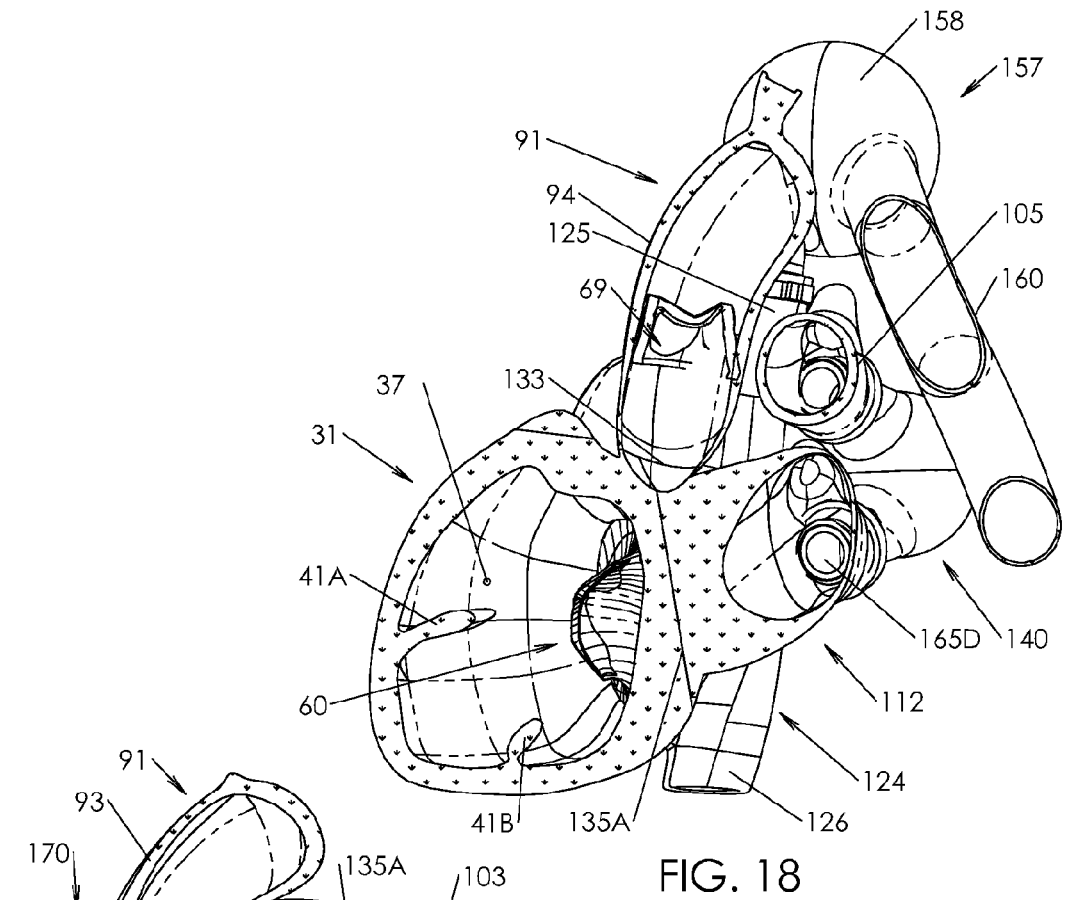
FIG. 18 is a sectional view of the preferred embodiment corresponding to the section line F-F of FIG. 17 showing the internal perspective of the left side of the heart model.
Figure 19:
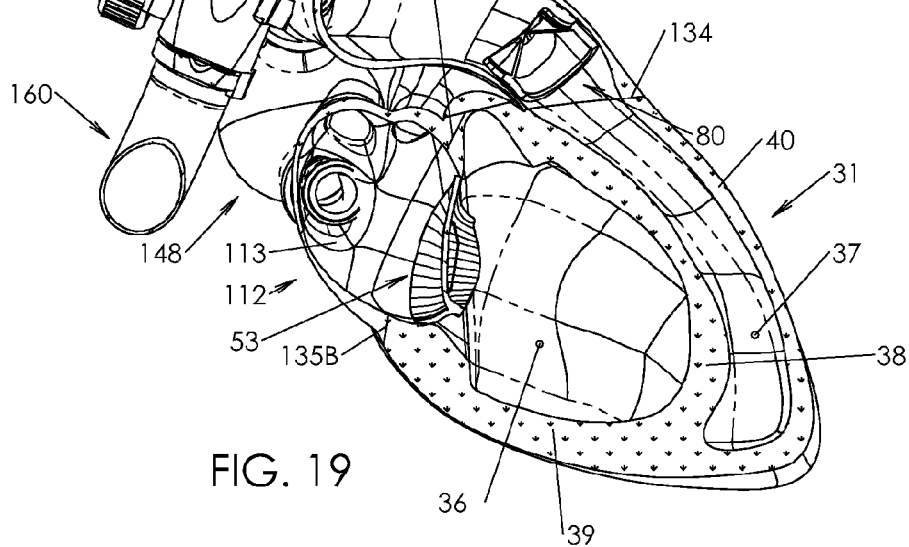
FIG. 19 is a sectional view of the preferred embodiment corresponding to the section line G-G of FIG. 17 showing the internal perspective of the right side of the heart model.

FIG. 17 shows an anterior view of heart model 30 from which section views of FIG. 18 and FIG. 19 are taken along section lines F-F and G-G respectively whereas FIG. 18 is a left looking section view of the right side of the heart and FIG. 19 is a right looking section view of the left side of the heart. Seen in FIG. 18 is right ventricle 37 of heart base 31 with tricuspid valve 60 installed whereas fluid is prohibited from exiting right ventricle 37 through tricuspid valve 60. Also seen is aortic valve 69 installed in the approximate position with ascending aorta 94 of aorta 91 in such a configuration whereas fluid is prevented from flowing in a reverse direction through ascending aorta 94 of aorta 91. Also seen in FIG. 18 is the interior of left atrium 112 and right pulmonary artery 105 of pulmonary trunk 103 towards the opening and interconnection of right pulmonary reservoir grouping 140. Additionally, a portion of systemic circulation reservoir grouping 157 including systemic reservoir structure 158 and conduit portion 160 is seen in this view.

In section view of FIG. 19 of the left side of the heart left ventricle 36 can be seen partitioned by mitral valve 53 along with a portion of right ventricle 37 that is in fluid communication with pulmonary valve 80 installed in pulmonary trunk 103. Intraventricular septum 38 separates left ventricle 36 and right ventricle 37 whereas left ventricular wall 39 and right ventricle wall 40 are exterior walls. Mitral valve 53 is seen in the installed orientation adapted to function as a one way valve from left atrium 112 to left ventricle 36. The attachment of left pulmonary reservoir grouping 148 to pulmonary trunk 103 and left atrium 112 can also nearly be seen whereas flow directed through pulmonary trunk 103 can be directed back to left atrium 112 through left pulmonary reservoir grouping 148 in one direction as permitted by pulmonary valve 80 and when heart base 31 is compressed. Additionally portions of descending aorta 93, fluid access port grouping 170 and conduit portion 160 can be seen in this view.

Figure 20:
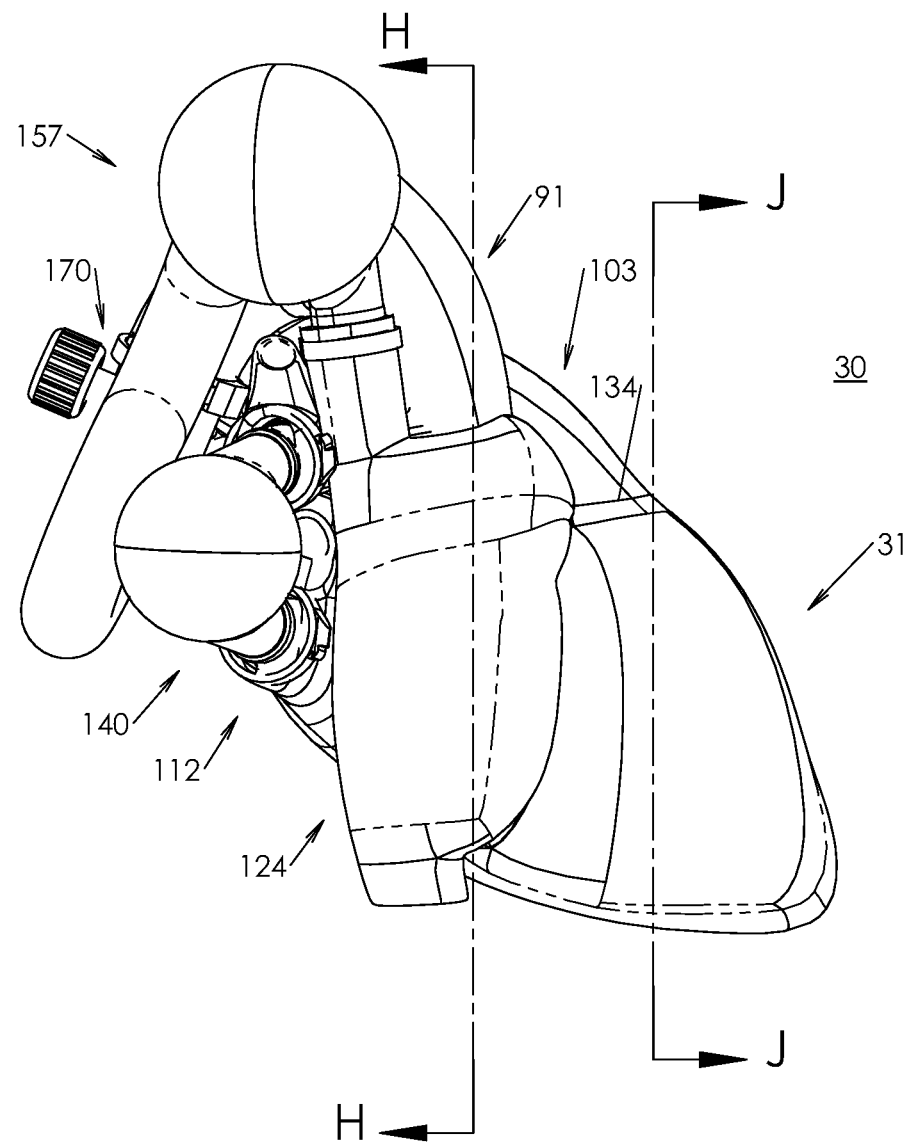
FIG. 20 is a lateral view of the right side of the fully assembled heart model according to the preferred embodiment corresponding to the orientation of the human heart as supported in the chest.
Figure 21:
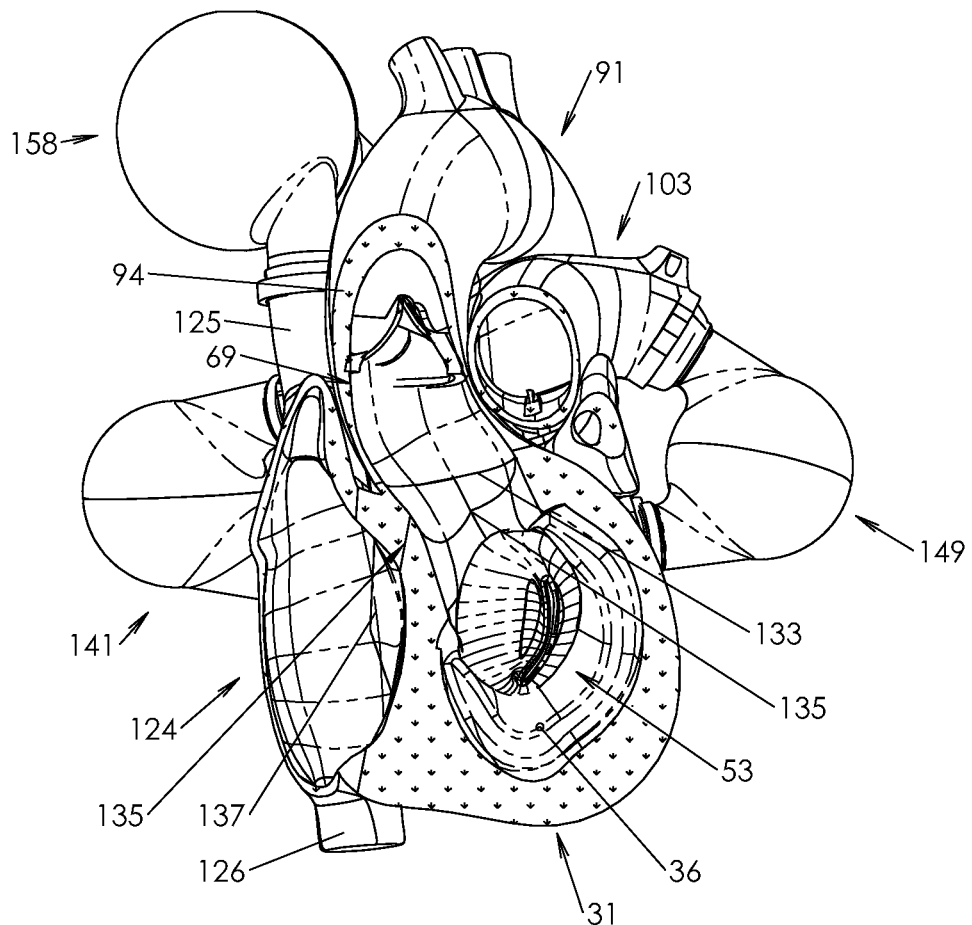
FIG. 21 is a sectional view of the preferred embodiment corresponding to the section line H-H of FIG. 20 showing the internal perspective of the posterior of the heart model.
Figure 22:
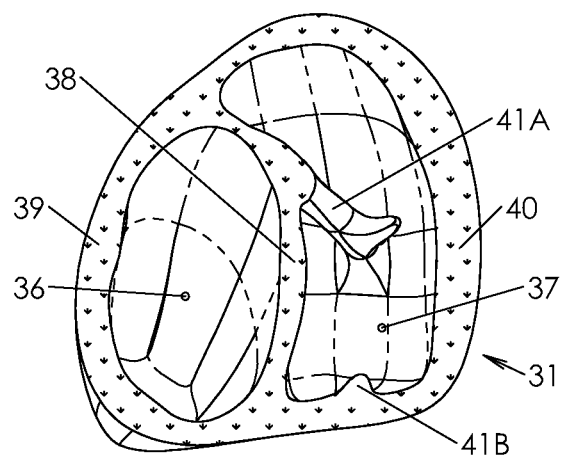
FIG. 22 is a sectional view of the preferred embodiment corresponding to the section line J-J of FIG. 20 showing the internal perspective of the anterior of the heart model.

FIG. 20 shows a lateral view of the right side of the fully assembled heart model according to the preferred embodiment from which section views of FIG. 21 and FIG. 22 are taken along section lines H-H and J-J respectively whereas FIG. 21 is anterior view of the posterior of the heart and whereas FIG. 22 is a posterior view of the anterior of the heart model. Shown in FIG. 21 is the interior of left ventricle 36 of heart base 31 as it is partitioned by mitral valve 53 and coupled with interior of aorta 91. Aortic valve 69 can be seen installed within whereas fluid within left ventricle 36 is allowed to pass through aortic valve 69 through aorta 91 but is prevented from passing through mitral valve 53.

According to the posterior view of the models anterior portion shown in FIG. 22 the heart base 31 is seen with left ventricle 36 and right ventricle 37 shown as separated by intraventricular septum 38. The cross-sections of left ventricle 36 and right ventricle 37 are substantially accurate and the perimeter shown in FIG. 22 as encompassing heart base 31 is reflective of the contour that one will grip to actuate the device by rhythmic compression of heart base 31. In compressing the device, left ventricle wall 39 and right ventricle wall 40 are displaced inward forcing a reduction in volume of both chambers and expelling of fluid into compliance chambers associated with the pulmonary and systemic flow loops. The pressure required to actuate the device is determined by a number of factors including (I) the stiffness of heart base 31 (as determined by the material properties of heart base 31 as well as the thickness of left ventricle wall 39, intraventricular septum 38, and right ventricle wall 40), the fluid pressure within the model, (II) compliance associated with the pulmonary and systemic flow loops and (III) the presence of posterior papillary structure 41A and anterior papillary structure 41B can influence the compressibility of heart base 31.

Figure 23:
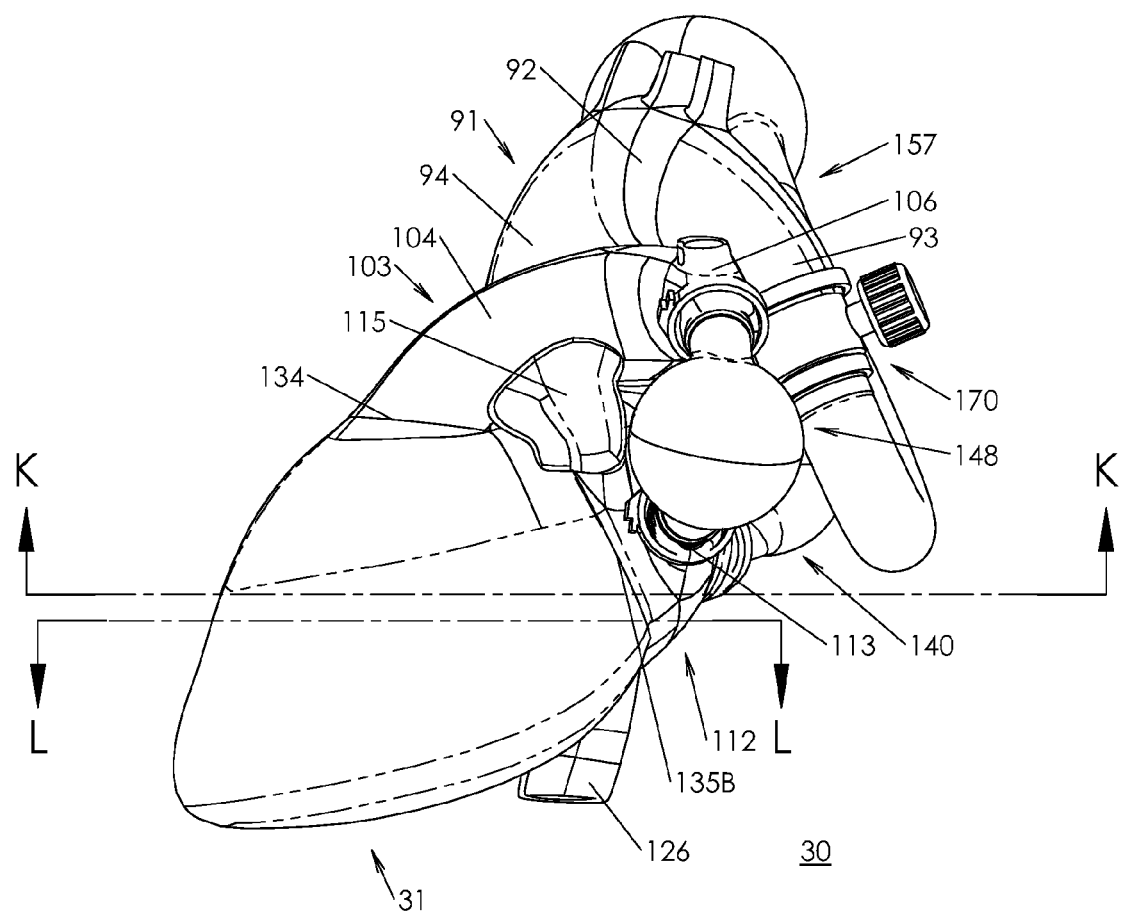
FIG. 23 is a lateral view of the left side of the fully assembled heart model according to the preferred embodiment corresponding to the orientation of the human heart as supported in the chest.
Figure 24:
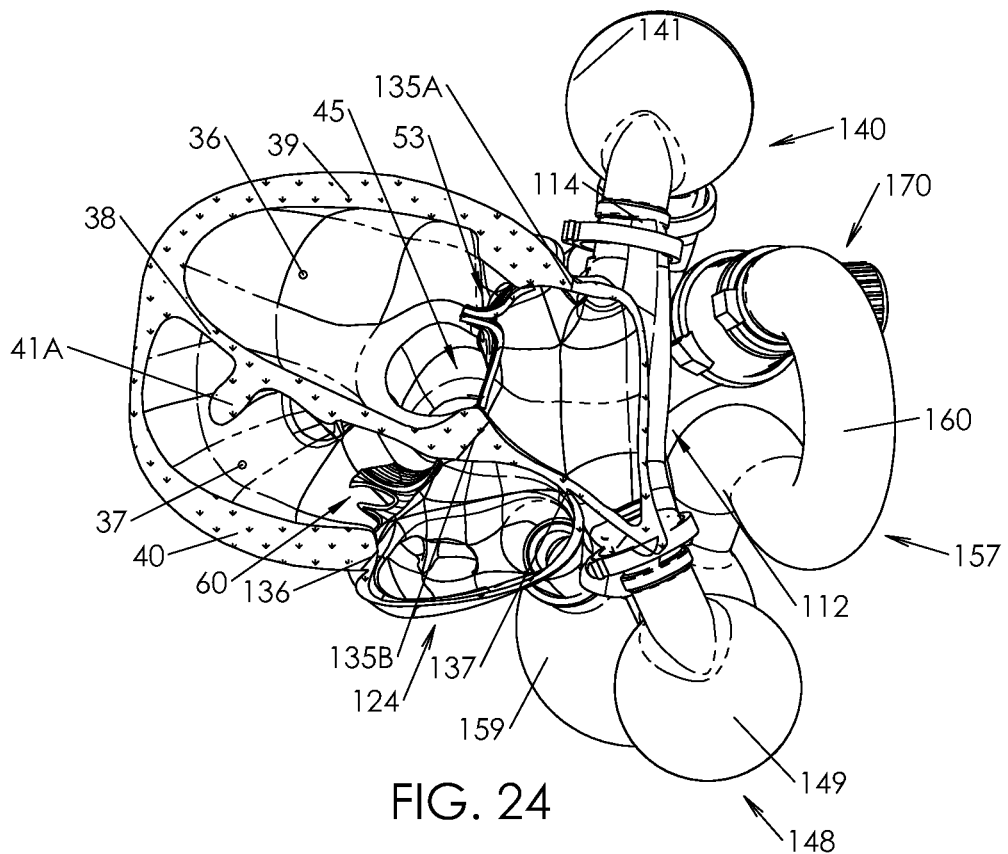
FIG. 24 is a sectional view of the preferred embodiment corresponding to the section line K-K of FIG. 23 showing a superior (looking up) section view of the superior portion of the heart model.
Figure 25:
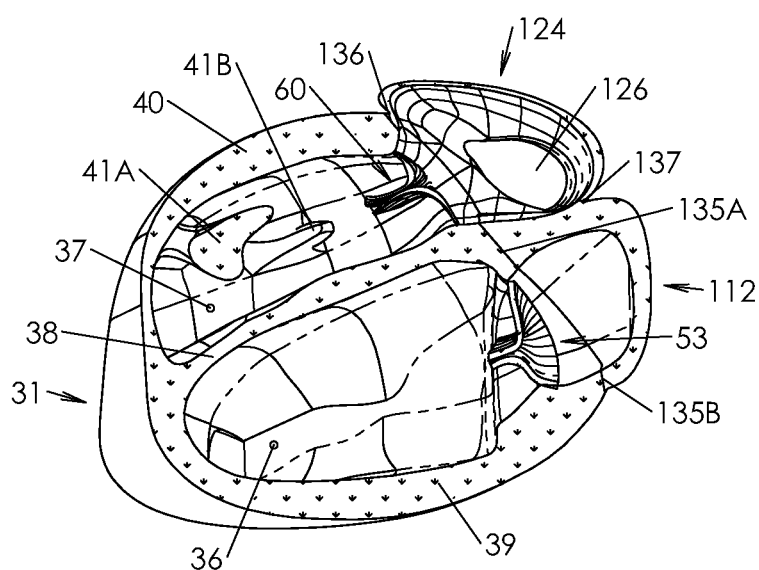
FIG. 25 is a sectional view of the preferred embodiment corresponding to the section line L-L of FIG. 23 showing an inferior (looking down) section view of the inferior portion of the heart model.

FIG. 23 shows left side view of the heart model according to the preferred embodiment from which section views of FIG. 24 and FIG. 25 are taken along section lines K-K and L-L respectively whereas FIG.24 is superior (looking up) view of the superior (top) of the heart model and whereas FIG.25 is a inferior (looking down) view of the inferior (bottom) of the heart model. FIG. 24 and FIG. 25 Both show left ventricle 36 and right ventricle 37 as they are partitioned by mitral valve 53 and tricuspid valve 60 respectively. In FIG. 24 the superior interior geometry of left atrium 112 and right atrium 124 can be seen. In FIG. 23 the inferior internal geometry of heart base 31, left atrium 112, and right atrium 124 can be seen. These major vessels are shown as being enclosed hollow structures consistent with accurate anatomical geometry and modified to the extent needed for demonstrating both the circulatory function of the heart in addition to the form of the heart.

Figure 26:
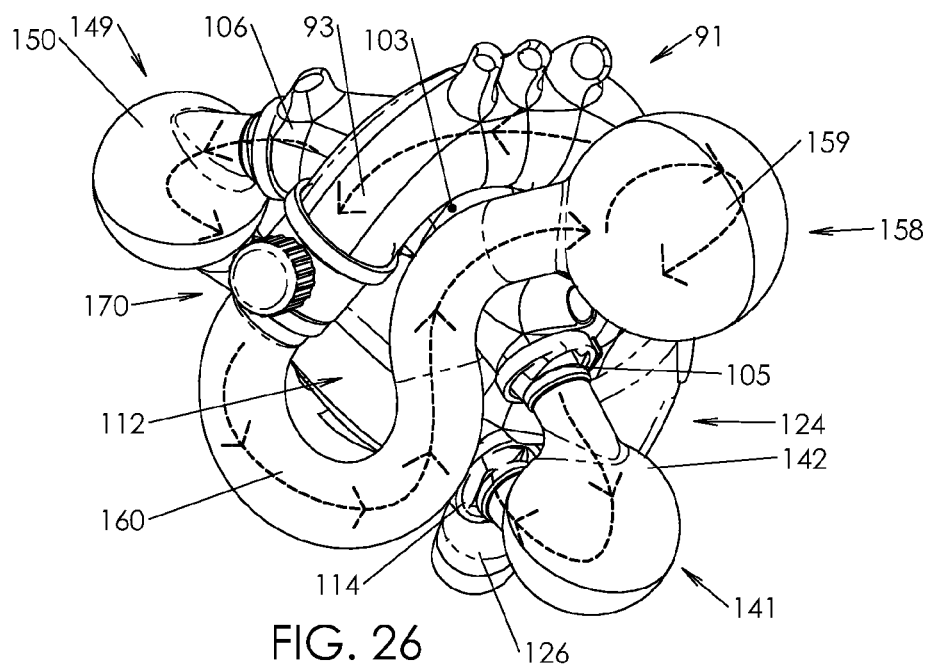
FIG. 26 is a back perspective view of the fully assembled heart model according to the preferred embodiment.
Figure 27:
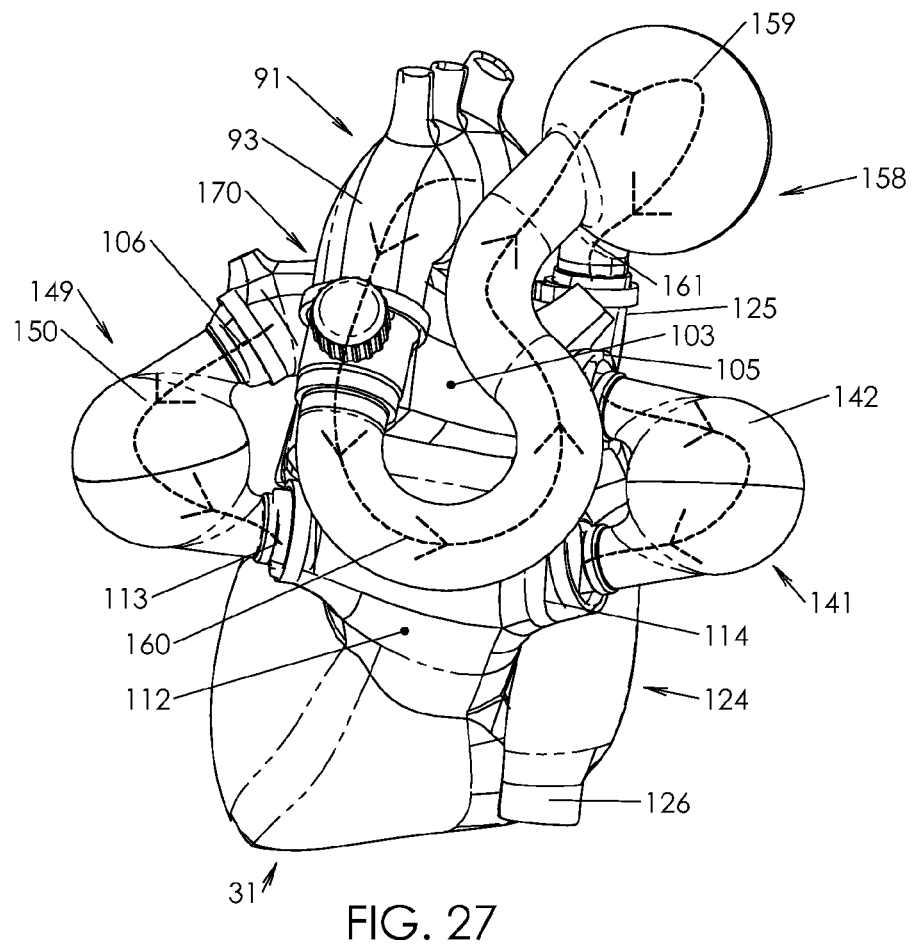
FIG. 27 is a posterior view of the fully assembled heart model according to the preferred embodiment corresponding to the orientation of the human heart as supported in the chest.

FIGS. 26-27 a back perspective view and posterior view respectively of the preferred embodiment that show the augmented structures as substitutes for pulmonary and systemic circulation. The unidirectional flow of the device is indicated by arrows shown along the flow path in dashed lines. Systemic flow is shown as proceeding from aorta 91, through descending aorta 93, through fluid access port grouping 170 and then through conduit portion 160 and spherical portion 159 of systemic reservoir structure 158. Pulmonary flow is embodied as two loops analogous to the right and left lung. Correspondingly, left side pulmonary flow is shown as proceeding from left pulmonary artery 106 of pulmonary trunk 103 entering into left pulmonary reservoir structure 149 and exiting into left pulmonary veins 113 of left atrium 112. Right side pulmonary flow is shown as exiting right pulmonary artery 105 of pulmonary trunk 103 entering right pulmonary reservoir structure 141 and exiting into right pulmonary veins 114 of left atrium 112. As indicated, the flow loops are routed substantially in close proximity whereas the heart model comprises a substantially closed loop circulatory system for enabling a viable functional model. Referring to FIGS. 28-42C, a second preferred embodiment of anatomical heart components is shown. As will be detailed in the forgoing description, the second preferred embodiment departs from the first preferred embodiment described previously in several significant ways. First, the vessels are segmented diffidently without substantially departing from anatomically correct geometry when assembled. The alternative segmentation disclosed ensures both a lap joint and butt joint at the mating interfaces. The revised segment provides the mitral valve to be pre attached to the left atrium and the tricuspid valve to be pre attached to the right atrium rather than these valves being attached to heart base component. The revised segmentation also provides the advantage of allowing the left and right ventricles of the heart base component to comprise only one large orifice each.

Furthermore, the second preferred embodiment provides for the aortic and pulmonary valve to be superimposed respectively to the aorta and pulmonary trunk subcomponents whereas these valves are molded in place rather than being separately molded components that are subsequently attached to the aorta and pulmonary trunk components. The specific advantages pertaining to summarized differences with respect to the second preferred embodiment can be understood in reference to specific figures as described below.

Figure 28:
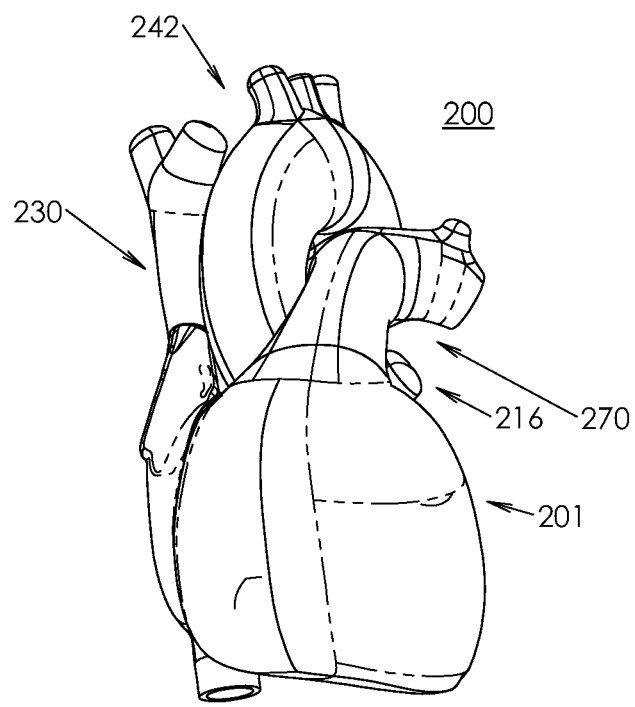
Figure 29:
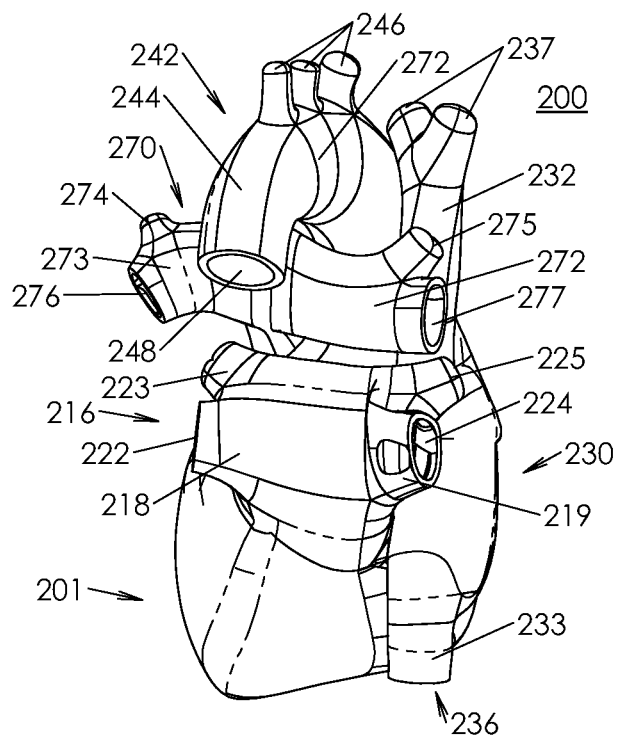
Figure 30:
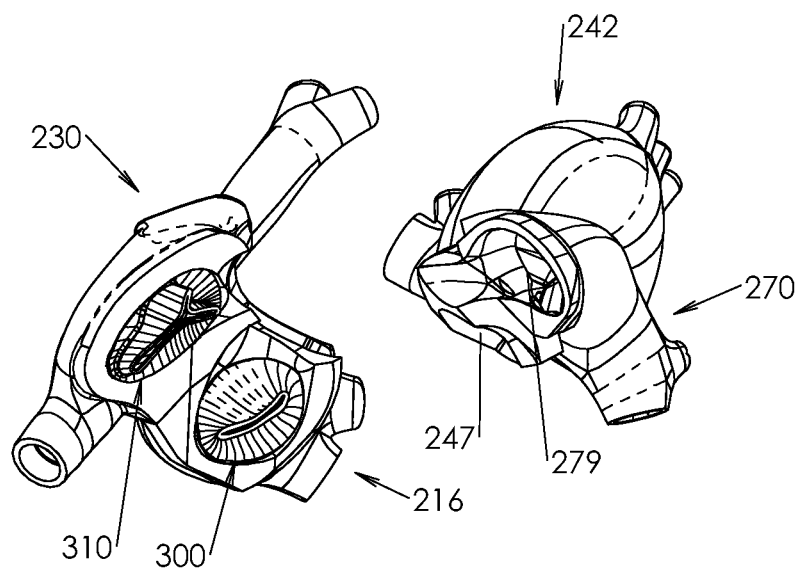
Figure 31:
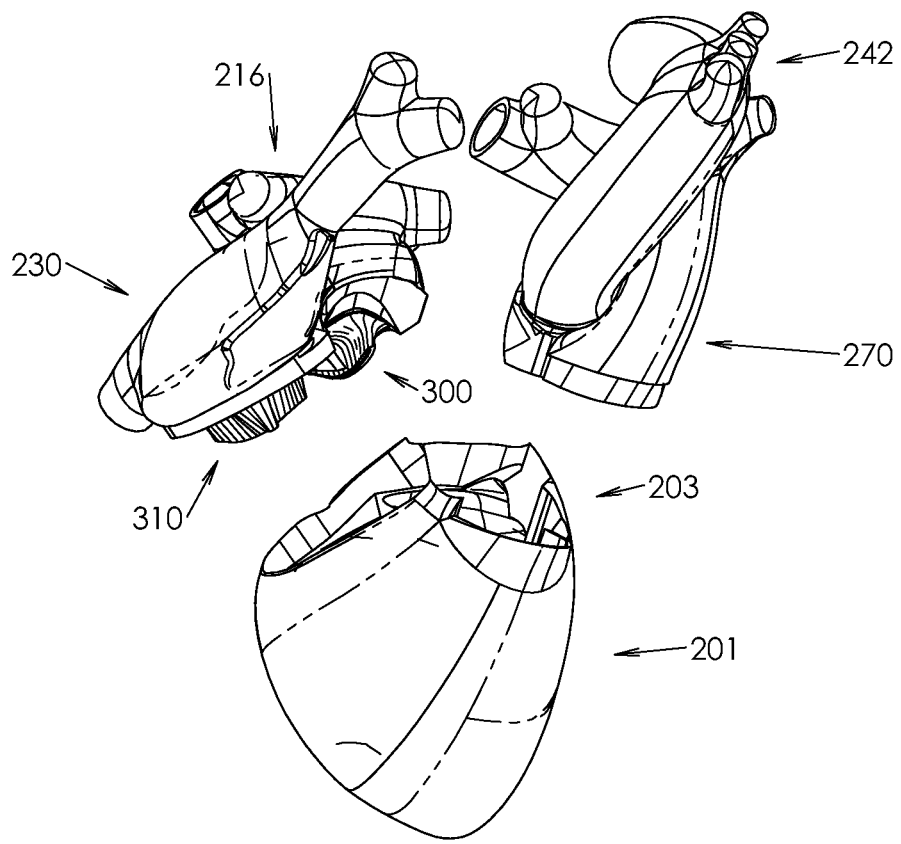

FIGS. 28-29 show an anterior and posterior view of heart vessel assembly 200 including heart base 201 whereas left atrium 216, right atrium 230, aorta 242 and pulmonary trunk 270 are connected thereto in the respective attached orientations. As seen in FIG. 29 the anatomically shaped vessels of the second preferred embodiment comprise numerous openings and enclosures whereas openings are provided for attachment of systemic circulation components and pulmonary circulation components for achieving a closed loop circulatory system.

Left atrium 216 comprises left vascular opening 222 and left vascular enclosure 223 at the formation of left pulmonary veins 218 and comprises right vascular opening 224 and right vascular enclosure 225 at end formation of right pulmonary veins 219. Pulmonary trunk 270 comprises left vascular enclosure 274 and left vascular opening 276 at formation of left pulmonary artery 273 and comprises right vascular opening 277 and right vascular enclosure 275 at formation of right pulmonary artery 272. In like manner to the first preferred embodiment of FIGS. 1-27, left vascular opening 276 of pulmonary trunk 270 is provided for fluid communication to left vascular opening 222 of left atrium 216 and right vascular opening 277 of pulmonary trunk 270 is provided for fluid configuration to right vascular opening 224 of left atrium 216 in establishing analogous pulmonary circulation.

Right atrium 230 of heart vessel assembly 200 comprises vascular enclosures 237 at end of superior vena cava 232 and vascular opening 236 at end of inferior vena cava 232. This is unlike the first preferred embodiment where systemic flow was directed through an opening in the superior vena cava and the inferior vena cave was closed. Aorta 242 of heart vessel assembly 200 comprises vascular enclosures 246 along arch 243 and vascular opening 248 at descending aorta 244 in like manner to the first preferred embodiment. Thus according to the second preferred embodiment, heart vessel assembly 200 is adapted to provide systemic circulation from vascular opening 248 of aorta 242 to vascular opening 236 of right atrium 230 whereas the descending aorta forms a closed loop with the inferior vena cava. The advantage of linking the descending aorta with the inferior vena cava in reference to the model is that when providing the systemic circulation components including an elastic reservoir for systemic flow, the circulatory model does not become so top heavy as was the case when the systemic reservoir is supported directly above the superior vena cava according to the first preferred embodiment. By adapting the device for connecting the descending aorta with the inferior vena cava, the systemic reservoir can be supported at a more desirable position for enabling visualization of the model while also detracting from one's ability to grip and handle the model.

It is understood in light of the second preferred embodiment the invention can be practiced in various configurations of linking the aorta to right atrium in providing system circulation loop and in linking the pulmonary trunk to the left atrium for providing pulmonary circulation. As shown in FIG.

28, left vascular enclosure 223 and right vascular enclosure 225 of left atrium 216, vascular enclosures 237 of right atrium 230, vascular enclosures 246 of aorta 242, and left vascular enclosure 274 and right vascular enclosure 275 of pulmonary trunk 270 are substantially round and domed-shaped at the vessel terminations. This is especially advantageous for the manufacturing of these structures since molded subcomponents are comparatively more readily extracted from the molds and since bubbles are less likely to be trapped at vessel extensions due to tight edges or crown like ridges as was in the case of the first preferred embodiment.

Referring to FIGS. 20-31, sub assemblies of the major vessels are shown in a partially mated relationship but not-affixed to the heart base. Left atrium 216 and right atrium 230 form the basis of a first subassembly whereas mitral valve 300 is attached to left atrium 216 and tricuspid valve 310 is attached to right atrium 230 in their respective attached orientations. The second subassembly shown is pulmonary trunk 270 attached to aorta 242 with 247 and lumen 278 provided for fluid communication with heart base 201. A key departure from the first preferred embodiment that will be evident in the description in reference to FIGS. 32-36B is the substantially improved segmentation of left atrium 216, right atrium 230, aorta 242, and pulmonary trunk 270, for the purposes of attachment to superior portion 203 of heart base 201.

Unlike the first preferred embodiment in which the attachment interface of all the major vessels were configured as simple butt joints, the seconded preferred embodiment shows interfaces forming both butt joints and lap joints that substantially surround all the junctures of the major vessels with the heart base 201. FIGS. 32-36B show the improved segmentation of anatomical geometry whereas the extent if interface along bonded surfaces in increased. The provision of both lap joints a butt joints surrounding the hollow vessels ensure a more durable and resilient attachment of the manor vessels when bonded together. Moreover, the lap joints displaced along superior portion 203 of heart base 201 and of substantially close with lap joints of left atrium 216, right atrium 230, aorta 242, and pulmonary trunk 270 so that mated components are held in a substantially biased manner for ensuring proper orientation when bonding the vessels together.

Although aorta 242 is shown attached to pulmonary trunk 270 and left atrium 216 is shown attached to right atrium 230 it is necessary according to the second preferred embodiment to first fix these components together. Alternatively, one by one, vessels can be attached to heart base 201 at their mating positions along superior portion 203.

Now in reference to FIGS. 32-36B, the improved segmentation and interface of the heart components are according to the second preferred embodiment of the present invention.

Figure 32:
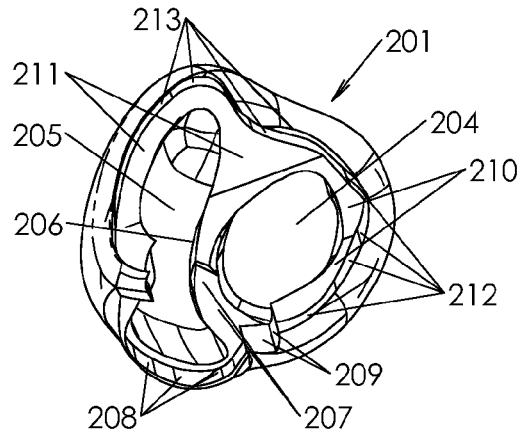

FIG. 32 shows a perspective view of heart base oriented toward left ventricular orifice 204 and right ventricular orifice 205 and wherein intraventricular septum 206 is displaced therein between. Many of the interfaces can be seen including butt joint surface(s) 207 and lap joint surface(s) 208 for mating with pulmonary trunk 270, butt joint surface(s) 207 and lap joint surface(s) 209 for mating with aorta 242, butt joint surface(s) 210 and lap joint surface(s) 212 for mating with left atrium 216, and butt joint surface(s) 211 and lap joint surface(s) 213 for mating with right atrium 230. Preferably both butt joint surface(s) and lap joint surface(s) are provided for attachment of all the interconnecting major vessels to heart base 201 and both types of surfaces surround the parameter of the mating components.

Looking at the perspective view shown in FIG. 32, it can be appreciated that the improved segmentation results in the orifices of heart base 201 being larger single orifices as compared to the first described embodiment in which the right ventricle comprised two smaller orifices and the left ventricle two smaller orifices. While with more than one orifice per ventricle it becomes likely necessary for separable core patterns to be used when molding the heart base component, this is not the case with the second preferred embodiment of heart base 201 whereas a single core pattern for defining the internal geometry of the right ventricle can be readily extracted from right ventricular orifice 205 and a single core pattern defining the internal geometry of the left ventricle can be readily extract through left ventricular orifice 204.

Figure 33:
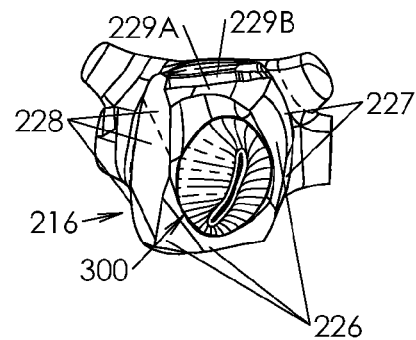

Shown in FIG. 33 is a perspective view of left atrium 216 with mitral valve 300 affixed oriented along the bottom end of left atrium 216 and showing mating surfaces. The interfacing surfaces shown include butt joint surface(s) 226 and lap joint surface(s) 227 for mating with heart base 201, lap joint surface(s) 228 for mating with right atrium 230, and lap joint surface(s) 229A and butt joint surface(s) 229B for mating with aorta 242.

Figure 34:
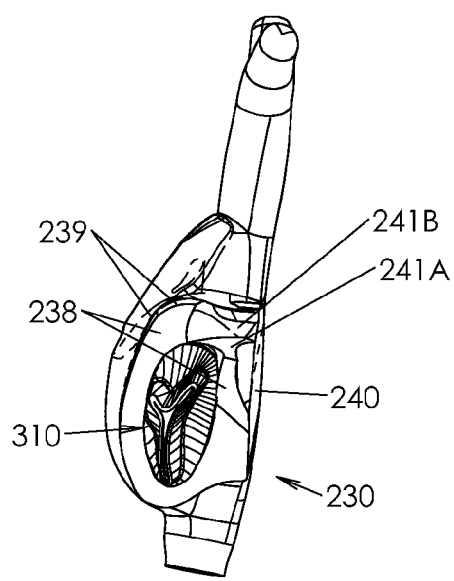

Shown in FIG. 34 is a perspective view of right atrium 230 with tricuspid valve 310 affixed oriented along the bottom end of right atrium 230 and showing mating surfaces. The interfacing surfaces shown include lap joint surface(s) 240 for mating with left atrium 216, butt joint surface(s) 238 and lap joint surface(s) 239 for mating with heart base 201, and butt joint surface(s) 241A and lap joint surface(s) 241B for mating with aorta 242.

Figure 35:
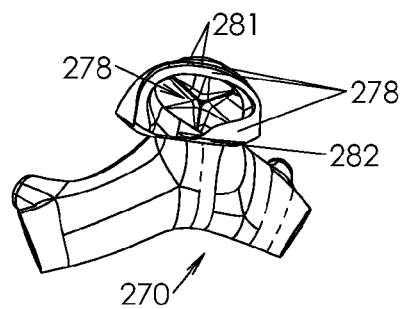

Shown in FIG. 35 is a perspective view of pulmonary trunk 270 oriented along the bottom end and also aligned with lumen 278 with mating surfaces shown. Butt joint surface(s) 280 and lap joint surface(s) 281 are provided for mating with heart base 201. Lap joint surface(s) 282 are shown that with aorta 242.

Figure 36A:
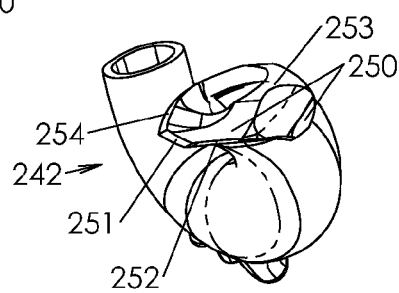
FIG. 36A-36B are perspective views of aorta according to the second preferred embodiment. The views are oriented in respect to interface of attachment to heart base and other components.
Figure 36B:
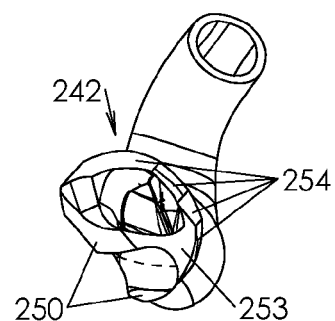

Shown in FIG. 36A-36B are perspective views of pulmonary trunk 270 oriented along bottom end whereas mating surfaces are shown. Butt joint surface(s) 250 and lap joint surface(s) 251 mate with heart base 201. Lap joint surface(s) 252 mate with pulmonary trunk 270. Butt joint surface(s) 253 and lap joint surface(s) 254 mate both with left atrium 216 and right atrium 230.

There are numerous advantages associated with the provision of both lap joints and butt joints as described for mating the major vessels together. The principle advantage is improved bond line for ensuring increased strength and durability of the device in resisting rupture and leakage along the bond interfaces. As the heart model is adapted to be pressurized and handled, it is desirous that the circulatory heart model can withstand considerable use and abuse while maintaining a pressurized and leak tight flow circuit. The preferred configuration incorporating lap joints for bonding the major vessels together is aimed at providing three times the bond line thickness than what would be associated with a butt joint alone. Preferably the minimum thickness of any vessel molded of silicone is 1 mm near a bond joint the minimum bond line of both butt and lap joints composed are at least 3 mm.

The alternative scheme incorporating lap joints further facilitates the interlocking of components wherein a single allowable orientation as defined by the mating geometry is permitted. Again, this facilitates correct orientation of the parts when bonding and contributes to the ease of holding the respective components in position while the adhesive is curing.

Figure 37A:
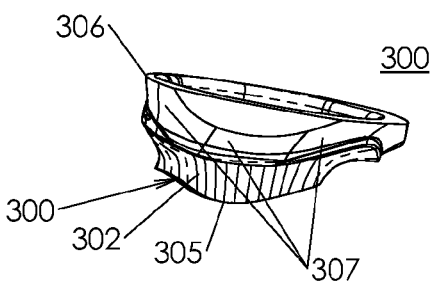
FIGS. 37A-37B are side and bottom views respectively of a mitral valve component according to the second preferred embodiment.
Figure 37B:
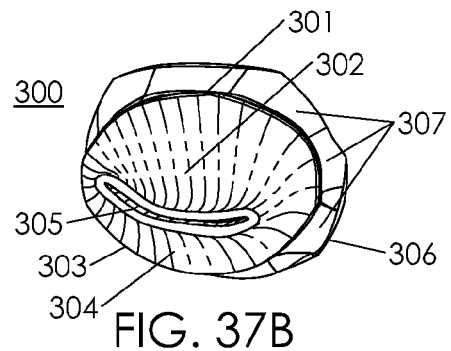

Shown in FIGS. 37A-37B, is mitral valve 300 according to the second preferred embodiment. Rather than being adapted to attach to heart base 201, mitral valve 300 is configured to interface with left atrium 216 and mate along bond surfaces 307 up to shoulder 306. Mitral valve 300 is of modified geometry in comparison to an actual biological heart valve but maintains substantial realism in shape and orientation in the functional portions within anterior annulus 301 and posterior annulus 303. Anterior cusp 302 and posterior cusp 304 assume the approximate shape of a human valve which can be characterized as similar in shape to a bishop's miter (or head band or turban) from which the name mitral derives. For the purposes of practicing the invention using analogous material that elastic and compliant to simulate the function of biological tissue, anterior cusp 302 and posterior cusp 304 are modified to have increase thickness as compared to biological valve tissue so as to ensure that mitral valve 300 maintains substantially unidirectional when the left ventricle is pressurized and hydraulic pressure is acting against mitral valve 300. When encountering differential pressure acting against the bottom of mitral valve 300 anterior cusp 302 and posterior cusp 304 bear up against each other causing a coaption zone and commisure 305 remains shut. When differential pressure is acting to open mitral valve 300, anterior cusp 302 and posterior cusp 304 spread apart. This causes commisure 305 to widen as fluid travels there through.

Mitral valve 300 comprises shoulder 306 having a significantly larger parameter as compared to anterior annulus 301 and posterior annulus 303 whereas bond surfaces 307 extends therein between for providing a substantial bond joint for bonding mitral valve 300 with left atrium 216. The varying shape and profile of anterior annulus 301, posterior annulus 303 and outward extending bond surfaces 307 and shoulder 306 aid in maintaining accurate positioning and alignment when affixing the mitral valve 300 to left atrium 216.

Figure 38A:
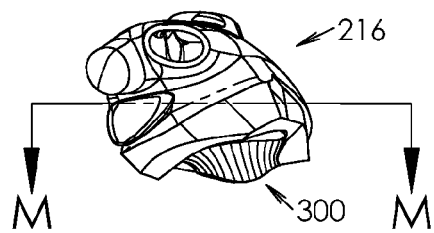
FIG. 38A is a perspective view of left atrium with mitral valve attached according to the second preferred embodiment.
Figure 38B:
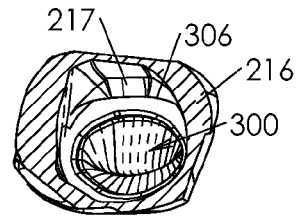
FIG. 38B is a sectional view of left atrium with mitral valve attached taken along section line M-M of FIG. 38A FIGS. 39A-38B are side and bottom views respectively of a tricuspid valve according to the second preferred embodiment.

Shown in FIG. 38A is a side view of left atrium 216 with mitral valve 300 attached. FIG. 38B is a section view taken along section lines M-M of FIG. 28A in which the top of mitral valve 300 can be seen in relationship to the mated position within chamber 217 of left atrium 216. Shoulder 306 matches the internal geometry of chamber 217 according to the intended fit of the mating components.

Figure 39A:
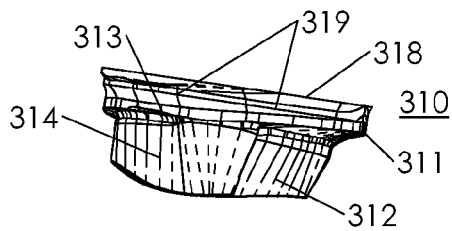
Figure 39B:
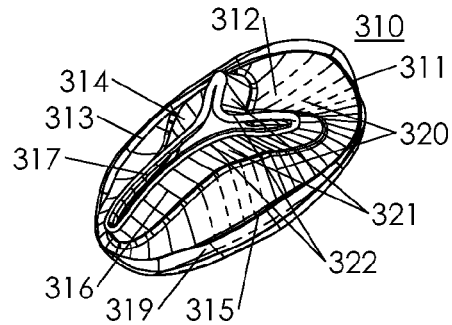

Shown in FIG. 39A and 39B are perspective views of butt joint surface(s) 210. Tricuspid valve 310 is a trileaflet valve with commisure 317 forming branching "Y" shape. Tricuspid valve 310 comprises three leaflets whereas anterior cusp 312 is displaced within anterior annulus 311, posterior cusp 314 is displaced within posterior annulus 313, and septal cusp 316 is displaced within septal annulus 315. Shoulder 318 extends outward beyond the leaflet parameters defined by anterior annulus 311, posterior annulus 313 for providing numerous occurrences of bond surfaces 319. The mating geometry attributed to bond surfaces 319 is in accordance with an intended close fitting relationship and right atrium 230 in which a sufficient bond joint can be accomplished.

Figure 40A:
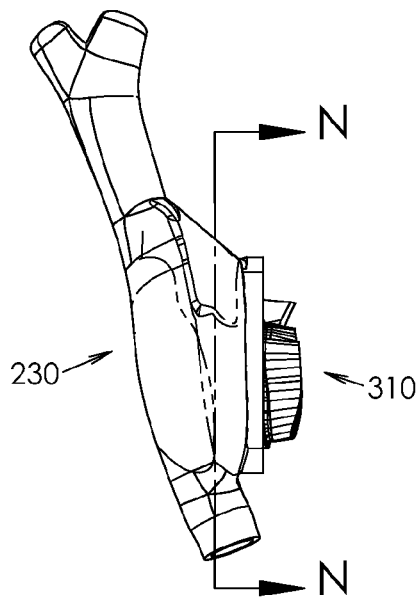
FIG. 40A is a perspective view of right atrium with tricuspid valve attached according to the second preferred embodiment.
Figure 40B:
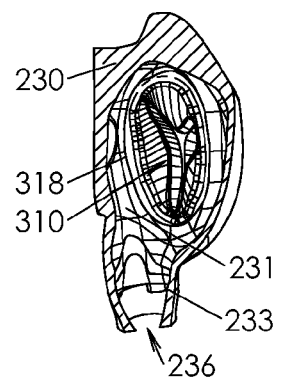
FIG. 40B is a sectional view of right atrium with tricuspid valve attached taken along section line N-N of FIG. 40A.

FIG. 40A shows right atrium 230 with tricuspid valve 310 affixed in the intended relative orientation. Bond surfaces 319 of tricuspid valve 310 are mated with right atrium 230 whereas shoulder 318 can be seen in the FIG. 40B which is a sectional view of the interior of right atrium 230 taken along section line N-N of FIG. 40A. According to the second preferred embodiment right atrium 230 is a hollow structure with chamber 231 in fluid communication with two openings including the tricuspid valve 310 and vascular opening 236 at end of inferior vena cava 232. With respect to the bottom of tricuspid valve 310, anterior cusp 312, posterior cusp 314 and septal cusp 316 have concave geometry for facilitating substantially unidirectional flow and preventing significant back flow by bearing up against each when encountering back pressure within the right ventricle in an analogous manner to a biological tricuspid valve.

When right atrium 230 is assembled to heart vessel assembly 200, a pressure in the right atrium 230 that is higher than in the right ventricle will cause tricuspid valve 310 to open and commisure 317 to enlarge as fluid passes there through. Conversely when the pressure within the right ventricle exceeds the pressure in right atrium 230, fluid will act against the tricuspid valve 310 causing commisure 317 to shut and substantial back flow will be prevented. For the purposes of using synthetic materials, some modifications are preferably made to the valve geometry while greatly departing from the general shape and configuration of a biological tricuspid valve. The tri-leaflet configuration with anterior cusp 312, posterior cusp 314 and septal cusp 316 is similar to actual human anatomy in that each has a curved belly and forming a coaption zone within when pressure is bearing against the concave side of the valve during closure for preventing retrograde flow.

Shown in FIGS. 41A-41C are views of aorta 242 having integral aortic valve 256. FIG. 41A shows a perspective view of aorta 242 wherein entrance opening 247 is seen 247 along with butt joint surface(s) 253 and lap joint surface(s) 254 which are not seen in the orientations shown in FIG. 36A and 36B. FIG. 41B is a sectional view aorta 242 and integral aortic valve 256 that is nearly perpendicular to the axis of ascending aorta 245 taken along section lines P-P of FIG. 41A. FIG. 41C is a section view of aorta 242 and integral aortic valve 256 that is nearly along the axis of ascending aorta 245 taken along section line Q-Q of FIG. 41A.

In FIGS. 41B-41C aortic valve 256 can be seen embedded within aorta 242. Thus this second preferred embodiment and differs from the first preferred embodiment in that aortic valve 256 is molded as part of aorta 242 and is not a separate subcomponent that is subsequently bonded within aorta 242. A principal advantage of the integrated construction is that it shares the vessel wall of aorta 242 as part of its framework. Thus a lumen of maximum parameter can be maintained and, without the separate framework, the valve has a lager envelope when opened for allowing unidirectional flow. The larger opening results in much less flow impedance and better visitation of valve actuation than would be the case with the first preferred embodiment described previously. Aortic valve 256 is a trileaflet configuration analogous to a biological aortic valve whereas commissure 259 is oriented along three spaced apart lines meeting at vertex 261. Occurrences of cusp 257 are interconnected to ascending aorta 245 and are supported along three occurrences of commissural junction(s) 260.

In FIG. 41C, an elevation view of two occurrences of cusps 257 can be seen in bearing against each other in the closed configuration. Each cusp 257 comprises a belly 262 and coaption zone 263 up to nodule 264. When fluid is directed through 247 and bears against inlet end 265, aortic valve 256 opens allowing unidirectional flow. When a pressure within aorta 242 at outlet end 266 exceeds that of the left ventricle the valve closes in and assumes the closed geometry showed wherein the three occurrences of cusp 257 press up against each other along coaption zone 263.

FIGS. 42A-42B show pulmonary valve 283 displaced within pulmonary trunk 270 in similar manner as aortic valve 256 integrally displaced within aorta 242 was described in reference to FIGS. 41A-41C. FIG. 42B is a sectional view pulmonary trunk 270 and integral pulmonary valve 283 taken along section lines R-R of FIG. 42A that is nearly perpendicular to the axis pulmonary trunk 270. FIG. 42C is a section view of pulmonary trunk 270 and integral pulmonary valve 283 taken along section line S-S of FIG. 42A that is nearly along the axis of pulmonary trunk 270.

Referring to FIGS. 42B-42C, pulmonary valve 283 can be seen embedded within pulmonary trunk 270 and differs from the first preferred embodiment in that pulmonary valve 283 is molded as part of pulmonary trunk 270 and is not a separate subcomponent that is subsequently bonded within pulmonary trunk 270. A principal advantage of the integrated construction is that pulmonary valve 283 shares the vessel wall of pulmonary trunk 270 as part of its framework and while maintaining the same the lumen and the valve does not require a separate framework. Without additional framework, the valve has a lager envelope in which it can open when allowing unidirectional flow without as much impedance in comparison to the first preferred embodiment described previously. Pulmonary valve 283 is a trileaflet configuration with three occurrences of cusp 284 analogous to a biological aortic valve whereas annulus 285 is oriented along three spaced apart lines meeting at vertex 288. The three occurrences of cusp 284 are interconnected to pulmonary trunk 270 along three occurrences of commissural junction 287. Pulmonary valve 283 is shown in the closed configuration with commissure 286 shut.

In FIG. 42C, pulmonary valve 283 can be seen sectioned along the axis of the valve in the closed configuration. Each occurrence of lap joint surface(s) 228 comprises belly 289 and coaption zone 290 up to nodule 291. When fluid is directed through lumen 278 and bears against inlet end 292, pulmonary valve 283 opens allowing unidirectional flow. When hydraulic pressure within pulmonary trunk 270 at outlet end 293 exceeds that of the right ventricle, the valve closes and assumes the shown wherein the three occurrences of cusp 284 press up against each.

The aortic and pulmonary valves as disclosed in context to the second preferred embodiment are significant improvements in several respects although the tooling and methodology of molding the aorta and pulmonary trunk poses some increased difficulty. In addition to the aim of reducing impedance through the valves, it is an aim of the invention to provide valve structures that can readily be visualized by the user of the device from the exterior of the device. The integral valves, since not being constrained in cross section by a separate frame work can open comparatively larger thus enabling a user to more vividly visualize valve opening and closure. An additional benefit is that by reducing the number of bonded components the appearance of the device can be significantly improved along integral valve locations since the difficult and somewhat messy operation of adhesive bonding of valves within lumens can be avoided.

Although the present invention has been described herein with reference to a particular embodiment, it will be understood that this description is exemplary in nature and is not considered as a limitation on the scope of the invention. The scope and spirit of the present invention is therefore only limited by the appended claims and the reasonable interpretation thereof.

What is claimed is:

1. A circulatory heart model of similitude to a biological heart with respect to shape and function, said model comprising:
   a heart structure, said heart structure being made of a pliable material that is displaceable under moderate external pressure and including hollow portions configured in likeness to major vessels of said biological heart including a base portion having chambers including left and right ventricles, a left atrium portion, a right atrium portion, an aorta portion and a pulmonary trunk portion, said heart structure also including pulmonary flow openings through said left atrium portion and said pulmonary trunk portion for providing flow communication within said heart structure, said heart structure further including systemic flow openings through said aorta portion and said right atrium portion;
   pulmonary circulation means, said pulmonary circulation means including at least one enclosed conduit interconnected between said pulmonary flow openings for providing analogous pulmonary flow communication between said pulmonary trunk portions to said left atrium portion of said heart structure;
   systemic circulation means, said systemic circulation means including at least one enclosed conduit interconnected between said systemic flow openings for providing analogous systemic flow communication between said aorta portion and said right atrium portion of said heart structure;
   said pulmonary circulation means and said systemic circulation means each including a respective expandable reservoir portion adapted for holding increased volume fluid under increased pressure; and
   wherein said circulatory heart model once fluid filled is substantially leak tight and is characterized with a closed flow loop interconnecting said hollow portions of said heart structure thereby providing closed loop circulation of fluid through said heart structure via pliable compression of said expandable reservoir portions under moderate external pressure.

2. The circulatory heart model according to claim 1, wherein said heart structure is anatomically analogous to a human heart.

3. The circulatory heart model according to claim 1, wherein said heart structure further includes mitral, tricuspid, aortic, and pulmonary valve structures displaced at approximate analogous anatomical positions.

4. The circulatory heart model according to claim 3, whereas said mitral, tricuspid, aortic, and pulmonary valve structures are each made of a pliable material and include abutting formations adapted to open and close and each being characterized with directional orientation configured to provide substantially unidirectional flow there through.

5. The circulatory heart model according to claim 4, wherein said heart structure and said valve structures are made of rubber having a Shore A hardness in the range of 20A to 75A.

6. The circulatory heart model according to claim 3, wherein said heart structure is made of transparent rubber and where said valves structures are made of a pigmented rubber, said valve structures being viewable from the outside of said heart structure when said heart structure is fluid filled with transparent fluid.

7. The circulatory heart model according to claim 1, wherein said heart structure is constructed of two or more subcomponents bonded together, said two or more subcomponents bonded together form geometry of said base portion, said left atrium portion, said right atrium portion, said pulmonary trunk portion, and said aorta portion.

8. The circulatory heart model according to claim 1, wherein said heart structure includes a base subcomponent, left atrium subcomponent, right atrium subcomponent, pulmonary trunk subcomponent and aorta subcomponent, each said subcomponent respectively corresponding in anatomical appearance to said left atrium portion, said right atrium portion, said pulmonary trunk portion, and said aorta portion of said heart structure.

9. The circulatory heart model according to claim 8, wherein said left atrium subcomponent, said right atrium subcomponent, said pulmonary trunk subcomponent, and said aorta subcomponent are adapted to be joined to said base subcomponent at a superior region of said base portion.

10. The circulatory heart model according to claim 9, wherein said left atrium subcomponent, said right atrium subcomponent, said aorta subcomponent, and said pulmonary trunk subcomponent are each configured to have a bond interface of varying geometry adapted to mate with said base subcomponent such that said base subcomponent is configured to have a bond interface of mating geometry.

11. The circulatory heart model according to claim 10, wherein said left atrium subcomponent, said right atrium subcomponent, said aorta subcomponent, and said pulmonary trunk subcomponent are each configured to have a bond interface of both butt joints and lap joints when mated to said base subcomponent, and wherein said base component is configured to have a bond interface of mating geometry for forming both butt joints and lap joints.

12. The circulatory heart model according to claim 10, wherein said base subcomponent is a hollow structure including a left ventricle and a right ventricle separated by a ventricular septum in similitude to anatomical geometry, said base subcomponent having an open end with one or more left ventricular openings for fluid communication with said left atrium subcomponent and said aorta subcomponent when attached to said base subcomponent and with one or more right ventricular opening for providing fluid communication with said right atrium subcomponent and said pulmonary trunk subcomponent when attached to said base subcomponent.

13. The circulatory heart model according to claim 12, wherein position of juncture between said base subcomponent and said left and right atrium subcomponents is positioned to approximate of a human heart's fibrous skeleton, and said base component includes a first left ventricular opening for fluid communication with said left atrium subcomponent, a second left ventricular opening for fluid communication with said aorta subcomponent, a first right ventricular opening for fluid communication with said right atrium subcomponent, and a second right ventricular opening for fluid communication with said pulmonary trunk subcomponent.

14. The circulatory heart model according to claim 12, wherein position of juncture between said base subcomponent with said left atrium subcomponent and said right atrium subcomponent is below approximate position of a human heart's fibrous skeleton and said base component includes one left ventricular opening and one right ventricular opening, said left ventricular opening for fluid communication with said left atrium subcomponent and said aorta subcomponent, said right ventricular opening for fluid communication with said right atrium subcomponent and said pulmonary trunk subcomponent.

15. The circulatory heart model according to claim 14, wherein
said mitral, tricuspid, aortic, and pulmonary valve structures are analogous to corresponding biological valves in terms of including cusps characterized with a curved belly portion and a coaption zones,
said mitral and tricuspid valve structures are molded subcomponents that are bonded, respectively, within said left atrium subcomponent and said right atrium subcomponent,
said mitral valve subcomponent and left atrium subcomponent are configured with mating geometry that bias said mitral valve in a fixed orientation with respect to said left atrium subcomponent, and
said tricuspid valve subcomponent and right atrium subcomponent are configured with mating geometry that biases the tricuspid valve in a fixed orientation with respect to said right atrium subcomponent.

16. The circulatory heart model according to claim 10, wherein said base subcomponent is manufactured as a single molding that is devoid from parting lines along exterior surfaces other than at said open end corresponding to the attachment locations of said left atrium subcomponent, said right atrium subcomponent, said aorta subcomponent, and said pulmonary subcomponent.

17. The circulatory heart model according to claim 8, wherein said pulmonary trunk subcomponent includes portions corresponding to geometry of right and left pulmonary arteries, said aorta subcomponent includes portions corresponding to geometry of descending aorta, aortic arch, and ascending aorta, said right atrium subcomponent includes portions corresponding to geometry of superior vena cava and inferior vena cava, and said left atrium subcomponent includes portions corresponding to geometry of left pulmonary veins and right pulmonary veins.

18. The circulatory heart model according to claim 8, wherein said pulmonary circulation means includes one or more fluid conduit structures bridging between, and connected to, said pulmonary trunk subcomponent and said left atrium subcomponent, and said systemic circulation means includes one or more fluid conduit structures bridging between and connected to said aorta subcomponent and said right atrium subcomponent.

19. The circulatory heart model according to claim 18, wherein said conduit structures of said pulmonary circulation means and said systemic circulation means each include said respective expandable reservoir portions adapted for holding increased volume fluid under increased pressure.

20. The circulatory heart model according to claim 18, wherein
said pulmonary circulation means is provided by a first fluid conduit structure and a second fluid conduit representing circulation through a right lung and left lung respectively,
said first conduit structure bridging between a right pulmonary vein portion of said left atrium component and said right pulmonary artery portion of said pulmonary trunk subcomponent, and
said second conduit structure bridging between a left pulmonary vein portion of said left atrium component and said right pulmonary artery portion of said pulmonary trunk subcomponent.

21. The circulatory heart model according to claim 18, wherein said systemic circulation means includes a single conduit structure that is configured to bridge between descending aorta portion of said aorta subcomponent and a superior vena cava portion of said right atrium subcomponent.

22. The circulatory heart model according to claim 18, further comprising a fluid access port means displaced along a systemic circulation path for injection of fluid and pressurization within said heart structure.

23. The circulatory heart model according to claim 1, further comprising a viewable particulate dispersed in fluid placed within said heart structure for aiding in visualization of flow through said heart structure.

24. A circulatory heart model of similitude to a biological heart with respect to shape and function, said model comprising:

a heart structure being made of a pliable material that is displaceable under moderate external pressure and having hollow portions configured in likeness to major vessels of said biological heart with two or more subcomponents bonded together for forming a base portion including chambers of the left and right ventricles, a left atrium portion, a right atrium portion, an aorta portion, and a pulmonary trunk portion, said heart structure being made from a pliable material that is displaceable with moderate external pressure, said heart structure also including pulmonary flow openings through said left atrium portion and said pulmonary trunk portion for providing flow communication within said heart structure, and said heart structure further including systemic flow openings through said aorta and said right atrium portion;

a pulmonary circulation means, said pulmonary circulation means including at least one enclosed conduit interconnected between said pulmonary flow openings for providing analogous pulmonary flow communication between said pulmonary trunk portions to said left atrium portion of said heart structure;

a systemic circulation means, said systemic circulation means including at least one enclosed conduit interconnected between said systemic flow openings for providing analogous systemic flow communication between said aorta portion and said right atrium portion of said heart structure;

said pulmonary circulation means and said systemic circulation means each including a respective expandable reservoir portion adapted for holding increased volume fluid under increased pressure; and wherein said circulatory heart model once fluid filled is substantially leak tight and is characterized with a closed flow loop interconnecting said portions of said heart structure thereby providing closed loop circulation of fluid through said heart structure via pliable compression of said expandable reservoir portions under moderate external pressure.

25. A construction kit for building a circulatory heart model of similitude to a biological heart with respect to shape and function, said kit comprising:

a set of subcomponents that when attached form a heart structure, a pulmonary circulation means, and a systemic circulation means;

said heart structure constructible of a pliable material that is displaceable under moderate external pressure and to include hollow portions configured in likeness to major vessels of said biological heart with two or more subcomponents bonded together for forming a base portion including chambers of the left and right ventricles, a left atrium portion, a right atrium portion, an aorta portion, and a pulmonary trunk portion, said heart structure being made from a pliable material that is displaceable with moderate external pressure, said heart structure also including pulmonary flow openings through said left atrium portion and said pulmonary trunk portion for providing flow communication within said heart structure, and said heart structure further including systemic flow openings through said aorta and said right atrium portion;

said pulmonary circulation means constructible to include at least one enclosed conduit interconnected between said pulmonary flow openings for providing analogous pulmonary flow communication between said pulmonary trunk portions to said left atrium portion of said heart structure;

said systemic circulation means constructible to include at least one enclosed conduit interconnected between said systemic flow openings for providing analogous systemic flow communication between said aorta portion and said right atrium portion of said heart structure;

said pulmonary circulation means and said systemic circulation means each including a respective expandable reservoir portion adapted for holding increased volume fluid under increased pressure; and wherein said circulatory heart model once constructed and fluid filled is substantially leak tight and is characterized with a closed flow loop interconnecting said portions of said heart structure thereby providing closed loop circulation of fluid through said heart structure via pliable compression of said expandable reservoir portions under moderate external pressure.

\* \* \* \* \*